United States Patent [19]
James et al.

[11] Patent Number: 5,666,547
[45] Date of Patent: Sep. 9, 1997

[54] METHOD AND APPARATUS FOR FRAMING A SERIAL DATA STREAM

[75] Inventors: Gary Lloyd James, Richardson; Jeremy David Omas, Irving, both of Tex.

[73] Assignee: Alcatel Network Systems, Inc., Richardson, Tex.

[21] Appl. No.: 311,574

[22] Filed: Sep. 23, 1994

[51] Int. Cl.$^6$ .................................................. G06F 7/00
[52] U.S. Cl. .................. 395/898; 364/715.09; 364/238; 364/259.4; 364/284.1; 364/DIG. 1
[58] Field of Search .................. 395/849, 850, 395/436, 460, 464, 600, 650, 800, 200.17; 364/419.13, 419.14, 419.8, 419.19, 715.1, 715.9, 715.11; 370/82, 83, 99, 105.1, 105.4, 105.3, 112; 340/146.2

[56] References Cited

U.S. PATENT DOCUMENTS

| | | | |
|---|---|---|---|
| 4,674,088 | 6/1987 | Grover | 370/105.3 |
| 4,723,206 | 2/1988 | Kojima et al. | 395/800 |
| 4,885,678 | 12/1989 | Kojima et al. | 395/800 |
| 4,967,411 | 10/1990 | Grover | 370/110.1 |
| 5,005,191 | 4/1991 | O'Conner et al. | 375/368 |
| 5,010,559 | 4/1991 | O'Conner et al. | 375/368 |
| 5,379,420 | 1/1995 | Ullner | 395/600 |
| 5,483,539 | 1/1996 | Kaufmann | 370/112 |
| 5,524,065 | 6/1996 | Yagasaki | 435/6 |

*Primary Examiner*—Alpesh M. Shah
*Attorney, Agent, or Firm*—Vinson & Elkins L.L.P.

[57] ABSTRACT

A method and apparatus for identifying at least a portion of a framing pattern in a data stream comprising a plurality of sequential bits. In the method embodiment, the method includes the step of identifying a set of successive candidate bits wherein the identified candidate bits are spaced apart from one another. The successive candidate bits include a first candidate bit, a last candidate bit, and a predetermined number of intermediary bits between the first candidate bit and the last candidate bit. Each of the intermediary bits has a numeric relative position between the first candidate bit and the last candidate bit. The method further includes the step of identifying a group of look ahead bits corresponding to each of the intermediary bits. Each of the groups has a number of look ahead bits, and the particular number of such bit for a given group equals the magnitude of the numeric relative position for the intermediary bit corresponding to the group. Lastly, the method includes the step of determining whether the candidate bit, the last candidate bit, and the intermediary bits match at least the portion of the framing pattern.

14 Claims, 9 Drawing Sheets

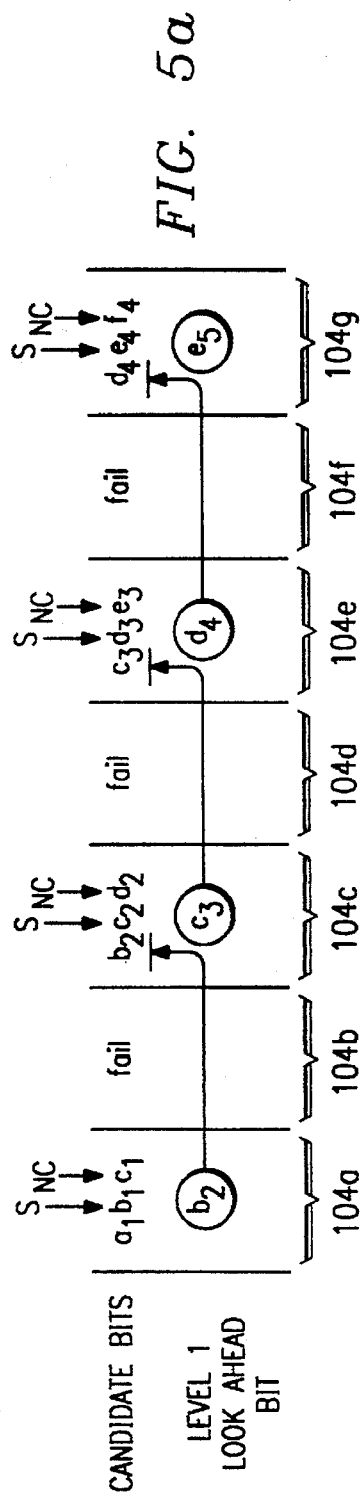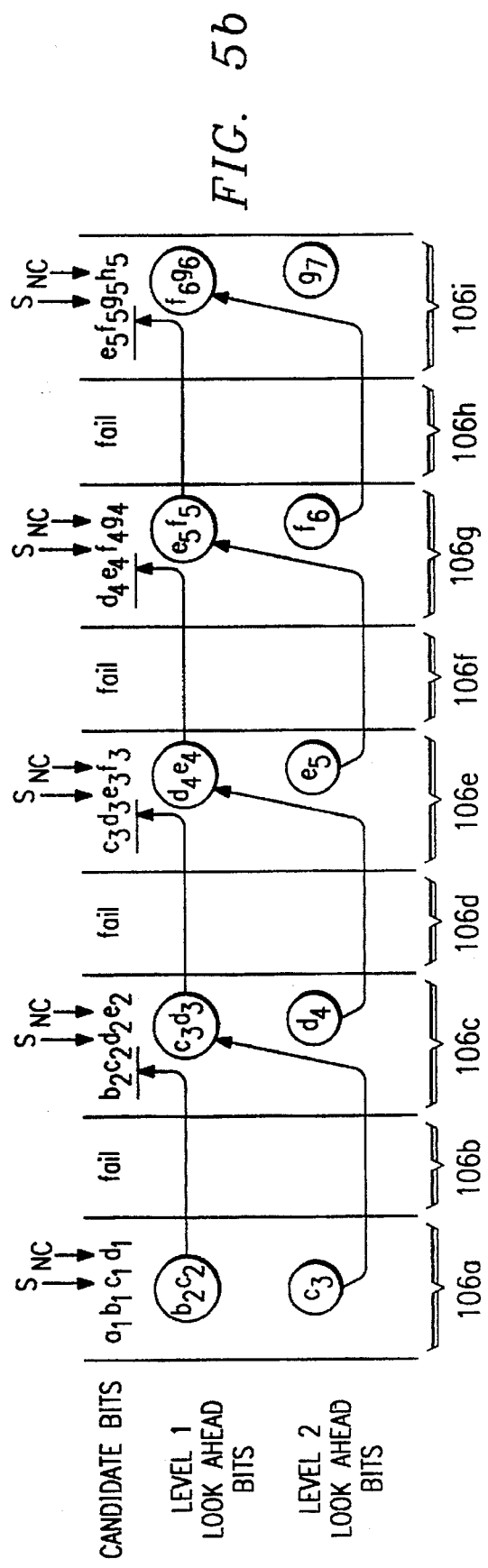

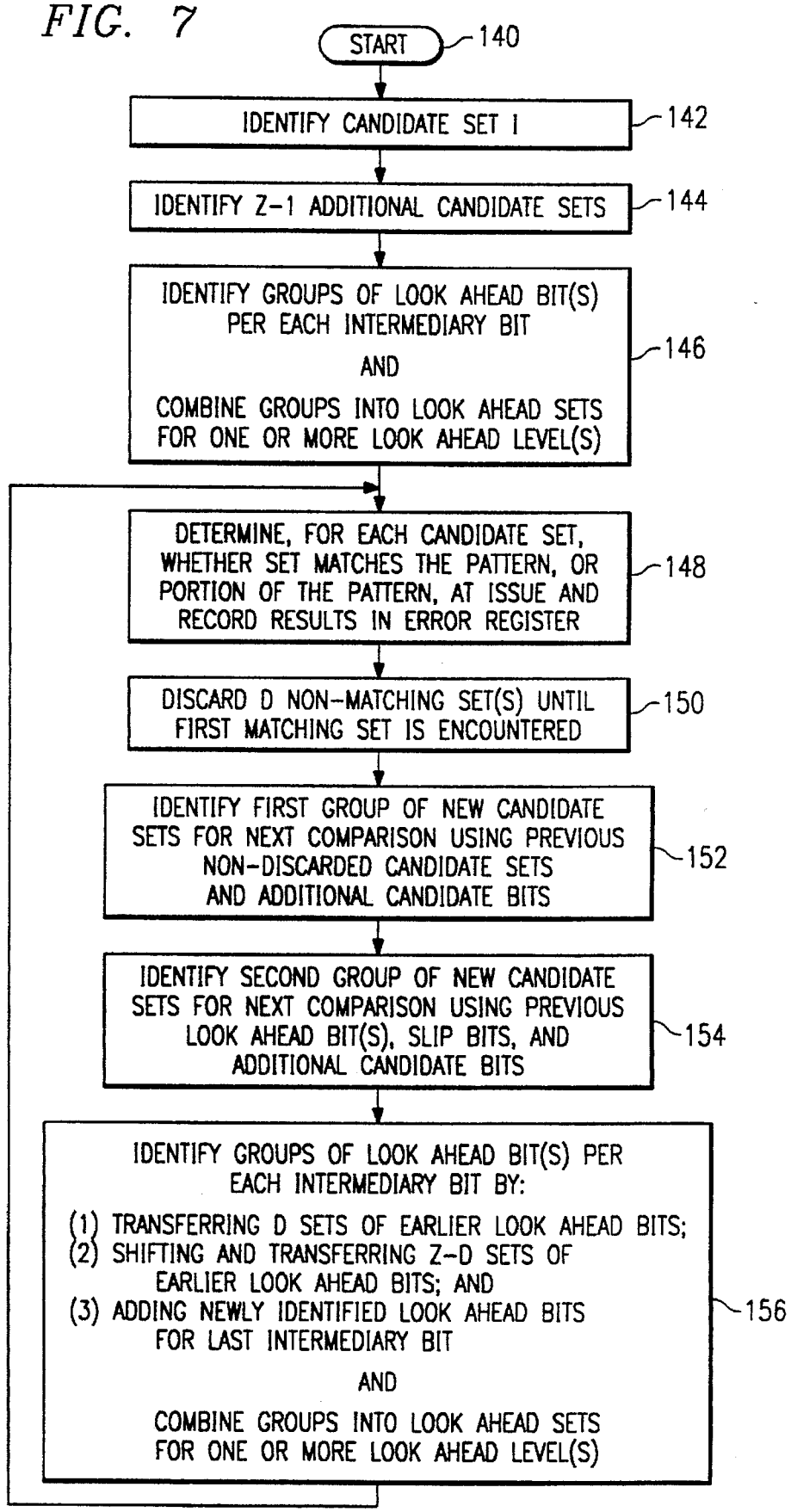

METHOD AND APPARATUS FOR FRAMING A SERIAL DATA STREAM

This invention relates to serial information communication, and is more particularly directed to a method and apparatus for framing a serial data stream based on the framing pattern.

BACKGROUND OF THE INVENTION

Serial data communication has become very common over the last several years in various industries, including business, commercial, and telecommunications to name a few. In order to communicate more information, often such information is multiplexed onto the media for transmission, and demultiplexed at the receiving end of the media. Thus, the receiving end requires some type of method and/or mechanism for synchronizing the information so that it may be properly demultiplexed into its original constituent parts. The present invention provides an improved method and apparatus in this regard.

FIG. 1 illustrates a prior art data frame of serial bits denoted generally at 10. Data frames are known in the art as packets of bits which are serially communicated from one point to another. Data frame 10 is illustrated as having several rows evenly numbered 12 through 24. Rows 12 through 24 by convention demonstrate that one row is serially communicated followed by the next and so on. Communication of the serial bits may be from right to left or left to right for a row, and may be further broken down by bytes or groups within the frame. Either the least or most significant bit of a byte or group may be communicated first when transmitting a byte or group.

As known in the art, the beginning and end of data frames are typically defined relative to some type of delimiting characteristic(s). Particularly, the delimiting characteristic is typically interspersed throughout the data frame. Thus, by identifying the delimiting characteristics of data frame 10, a system may determine the location of the beginning and end of the frame, as well as the location of any pre-specified information between its beginning and end. Such location techniques are commonly used to synchronize receipt of a data frame, or distinguish it from previously, or subsequently, received data frames.

The delimiting characteristics of a data frame may be established in many ways, and may be dictated by industry or application-specific standards. For example, each row 12 through 24 of data frame 10 includes a framing pattern sequence which consists of four specified bits located at fixed locations within each frame row. For illustration purposes, each fixed bit location for each row is successively labeled with reference characters "a", "b", "c", and "d." Thus, row 12 includes fixed bit locations 12a, 12b, 12c, and 12d, where each location stores a specified identifier bit. Rows 14 through 24 likewise include such fixed bit locations for containing similar frame identifier bits. Note that each fixed bit location is spaced apart a known number of locations from other bits. Typically, although not necessarily, the known number is constant, so that the identifier bits are periodically spaced within a frame. Therefore, and as detailed below, the format of data frame 10 permits a system to identify four evenly-spaced bits in a row and, if those bits match a pre-specified framing pattern, the beginning and end of data frame 10 may be located by knowing the distance between the bit pattern and the frame beginning and end. Although not shown, another type of delimiting characteristic, that is, another method of locating identifier bits, is fixing bit locations solely at the beginning of row 12 and the end of row 24. Still other types of delimiting characteristics are known, apparent, or will become apparent, to persons skilled in the art.

FIG. 2 illustrates a flow chart of a prior art method of searching a data frame, such as data frame 10 of FIG. 1, to locate the framing pattern and, thereby, determine the proper alignment of the frame. In general, the method arbitrarily chooses a given bit as a first candidate bit of the correct framing pattern. It thereafter examines enough periodically spaced bits after the first arbitrary bit to determine if the examined bits in their entirety are the proper framing pattern. If the assumed bits match the framing pattern, the beginning and end of the frame may be defined for synchronization or other purposes. If the assumed bits are not the proper framing pattern, a different first candidate bit is again assumed to be the first bit of the correct framing pattern and it, along with subsequent periodic bits, are examined. The method repeats until the proper framing pattern sequence is located. The specific steps of the prior art method are described below.

The method of FIG. 2 examines bits which are periodically spaced N bits apart in the serial data stream under consideration and, again, examines those bits under the assumption that they represent the correct framing pattern. In the example of FIG. 2, the method searches for a framing pattern used in the telecommunications industry for the framing pattern in a DS3 data frame. As known, the DS3 framing pattern consists of four bits, namely, 1001. Each bit is spaced 170 bit times from another framing bit. Note that the four bit pattern may begin anywhere within the sequence of these four bits, and therefore is valid as 1001, 0011, 0110, or 1100. Moreover, as discussed in connection with the following Table 1, at least three bits must be analyzed to determine if the assumed bit sequence is the proper framing pattern.

TABLE 1

| Case | Possible sequence | Possibly Valid? |
|---|---|---|
| 1 | 0 0 0 | No |
| 2 | 0 0 1 | Yes |
| 3 | 0 1 0 | No |
| 4 | 0 1 1 | Yes |
| 5 | 1 0 0 | Yes |
| 6 | 1 0 1 | No |
| 7 | 1 1 0 | Yes |
| 8 | 1 1 1 | No |

Table 1 illustrates the eight (i.e., $2^3=8$) cases of possible bit sequences which may be incurred when examining three bits. Moreover, Table 1 illustrates that four cases (i.e., cases 2, 4, 5, and 7) of the overall eight cases represent sequences which might indicate a valid framing pattern. In other words, if any of cases 2, 4, 5, or 7 are incurred, then the method must await a fourth bit to determine if the proper framing pattern has been detected. To the contrary, however, if any of cases 1, 3, 6, or 8 are incurred in the examining method, the method may conclude that it has not located the proper framing pattern and, thus, must choose an alternative set of bits in another effort to locate that pattern. Thus, given a method which examines bits to locate the pattern of 1001, at least three bits must be examined before any pattern can be disregarded as an invalid pattern.

Note also that the above describes detecting a single occurrence of the correct pattern, namely, four bits in the appropriate sequence as given. In actual operation, it is possible that the four bits might inadvertently occur in proper sequence even though the correct pattern has not been located. Accordingly, it is known in the art to ensure that the pattern itself repeats numerous times to ensure correct identification. For example, for a four bit pattern, it has been empirically determined that the entire pattern should be detected three consecutive times before it is concluded that in fact the correct pattern has been located. Thus, so long as the tested bits continue to be valid, a total of twelve bits are analyzed to ensure three successive arrivals of the proper framing pattern.

Having described some general principles involved in frame pattern recognition, reference is made to FIG. 2 wherein a prior art method of identifying proper frame pattern sequences is described. Beginning in step 26, a first candidate bit is identified at an arbitrary first location, $LOC_X$. This bit may be copied in a register or some other type of storage type device for subsequent evaluation. For example, a state machine could be used in lieu of a register, where the state of operation is representative of the previous bit or bits. Step 28 skips N-1 bits using a counter as the N1 bits are serially received. Step 30 identifies a second candidate bit at a location $LOC_{X+N}$, where the subscript X+N indicates that the second candidate bit is N bits after the first candidate bit identified in step 26. Like the first candidate bit, the second candidate bit may be copied in a register or the like for subsequent evaluation. Next, step 32, like step 28, skips N-1 bits, these N-1 bits following the second candidate bit at $LOC_{X+N}$.

Step 34 identifies a third candidate bit at a location, $LOC_{X+2N}$, and this third candidate bit is also stored in a register or the like. Having stored three bits, the method continues with step 36 wherein a first comparison is performed. Specifically, step 36 determines whether the three stored bits (from locations $LOC_X$, $LOC_{X+N}$, and $LOC_{X+2N}$) represent a valid portion of a framing pattern. If a valid pattern portion is detected, the method continues to step 37 which, as described below, continues the flow to determine if subsequent bits are likewise valid for a given framing pattern. If, however, a valid pattern is not detected, the method continues to step 40 which, as described below, creates an adjustment to begin the method over until the correct framing pattern is located. Thus, in the example of Table 1, the three candidate bits are compared to each of the eight cases shown therein. If the bits follow any of cases 2, 4, 5, or 7, the method continues to step 37; to the contrary, if the bits follow any of cases 1, 3, 6, or 8, the method continues to step 40.

As described above, if the process reaches step 37, then the bits encountered thus far represent a valid portion of the framing pattern in question, and the process continues to determine if a successive bit(s) continues to represent a valid pattern. In particular, step 37 establishes a count of valid bits incurred thus far. For purposes of example, the count is named "VALIDCNT", indicating the total count of successive matching candidate bits. Next, step 38, like steps 28 and 32, skips N-1 bits. Moreover, step 42, like steps 26, 30, and 34, identifies yet another candidate bit, namely, a fourth candidate bit at a location, $LOC_{X+3N}$, where the subscript X+3N indicates that the fourth bit is 3*N bits after the first candidate bit identified in step 26.

Step 44, in a manner similar to step 36, determines if the now-accumulated four candidate bits represent a valid framing pattern. If the four bits represent a valid pattern, the method continues to step 45a which, as mentioned above, begins the determination of whether the pattern of four bits has arrived three successive times. Particularly, step 45a determines if the number of valid successive candidate bits (i.e., VALIDCNT) exceeds twelve; if not, the method continues to step 45b which increments the count of successive candidate bits. Thereafter, steps 38, 42, 44, 45a, and 45b repeat until twelve valid successive candidate bits are identified. Of course, if an invalid candidate bit is incurred during the additional repetitions, then step 44 detects this occurrence and returns the method to step 40 as described above. On the other hand, if twelve valid successive candidate bits are incurred, the method continues to step 46 where a signal is issued identifying that the correct framing pattern within the serial data has been located and detected. Accordingly, in step 48 the method stops, having achieved its purpose. As discussed above, once the framing pattern is identified (as represented by the signal of step 46), dependent functions such as frame synchronization may be implemented.

Returning to step 44, note that the method continues to step 40 if the four candidate bits do not match the desired framing pattern. Additionally, as mentioned with reference to step 36, the method also continues to step 40 if the portion of candidate bits (three in example described) do not match any portion of the desired framing pattern. In either case, having reached step 40, it is recognized that the initially assumed location, $LOC_X$, was an inaccurate location for the first candidate bit in the framing pattern sequence. In the prior art method shown, the method then recommences to find a sequence of three new candidate bits, first by assuming a new location for the new "first" candidate bit. Particularly, in step 40, the method "slips" one bit, meaning, it skips to the next successive bit following the last identified candidate bit. In the prior art, this step is controlled by a state machine which causes the slip and then recommences the method with step 26. Accordingly, the "first" bit of the next three candidates is identified at a new location X which, because of the one bit slip, is the bit immediately following the last of the candidate bits in the previous sequence. For example, if step 40 were reached from a mismatch in step 36, then bits at locations $LOC_X$, $LOC_{X+2N}$, and $LOC_{X+3N}$ were the previous candidate bits. Thus, once step 40 slips to the next bit, the "first" candidate bit identified in the subsequent step 26 is actually at the location $LOC_{X+3N+1}$. Accordingly, as the method continues to step 30, the next identified bit is at location $LOC_{X+4N+1}$, and so forth.

From the above, note that the method of FIG. 2 continues until a valid framing pattern is identified. Moreover, note that each time an assumed pattern is determined to be invalid, the entire process repeats. In the prior art, this wait time is governed by the above-mentioned state machine which forces at least steps 26 through 36 to occur for each set of candidate bits. Because at least three candidate bits must be accumulated for each repetition of these steps, the method requires at least 2N bits to pass (i.e., the time necessary to accumulate three candidate bits) before the next determination can be made as to whether a valid pattern is detected. Recall, in the DS3 example described above, N is 170 and, therefore, 340 bits must pass (i.e., 2 * 170 bits) before the next determination is made as to whether a valid framing pattern is detected. Accordingly, valuable time is expended as the passage of those 2N bits occurs. Note also that a prior art example requiring more than three bits would require an additional delay of 1*N bit times for each additional bit beyond three bits before the next comparison is made.

Note also that FIG. 2 describes a single bit framer method, meaning, the method examines a first candidate single bit, a second candidate single bit, a third candidate single bit, and so forth. The prior art includes known multiple bit framers, meaning, the method of FIG. 2 is generally followed, but instead of a first candidate bit, a first group of successive candidate bits are collected, followed by a second group of successive candidates bits, followed by a third group of successive candidate bits, and so forth. The successive bits are then broken into candidate sets by taking corresponding bits from each group. For example, for a five bit framer evaluating three candidate bits, three groups of bits are collected and each group has five successive bits. Next, candidate bits are taken from corresponding locations within each group to form a set of candidate bits to be compared against the pattern at issue. Thereafter, the corresponding candidate bits in each set are examined to determine if they match the framing pattern. For the example above, the first bits of each group (e.g., the first bit of the first group, the first bit in the second group, and the first bit in the third group) are combined to form a first set of three candidate bits. Thus, these bits represent a sequence of spaced apart bits as in the instance of a single bit framer. This first set of candidate bits is then examined to determine whether they are a valid portion of a framing pattern. Simultaneously, the second bits of each group are likewise combined to form a second set of candidate bits and examined to determine whether they are a valid portion of a framing pattern, and so forth. Still further, the remaining three bits of the five bit groups are likewise accumulated with corresponding bits to determine whether any set of corresponding bits matches the framing pattern at issue. If no set matches the framing pattern at issue, the entire process repeats in the same manner as FIG. 2, but using sets of bits rather than single bits. Thus, each set, rather than each single bit, is examined in the multiple bit framer method. Thus, the multiple bit framer evaluates more possibilities at once in an effort to locate the framing pattern, but does so at the expense of additional hardware. Moreover, the prior art multiple bit framer suffers from the same drawback as the prior art single bit framer, namely, valuable time is expended as the process must completely repeat itself to collect a sufficient number of candidate bits to perform the necessary analysis.

It is therefore an object of the present invention to provide a method and apparatus for reducing the time necessary in locating a valid framing pattern.

It is a further object of the present invention to provide such a method and apparatus for reducing the necessary hardware in locating a valid framing pattern.

It is a further object of the present invention to provide such a method and apparatus for use in framer circuits using multiple consecutive slips.

It is a further object of the present invention to provide such a method and apparatus for use in either single or multiple bit framer circuits.

Still other objects and advantages of the present invention will become apparent to those of ordinary skill in the art having references to the following specification together with its drawings.

SUMMARY OF THE INVENTION

In the preferred embodiment, the present invention includes a method and apparatus for identifying at least a portion of a framing pattern in a data stream comprising a plurality of sequential bits. In the method embodiment, the method includes the step of identifying a set of successive candidate bits wherein the identified candidate bits are spaced apart from one another. The successive candidate bits include a first candidate bit, a last candidate bit, and a predetermined number of intermediary bits between the first candidate bit and the last candidate bit. Each of the intermediary bits has a numeric relative position (e.g., first, second, and third) between the first candidate bit and the last candidate bit. The method further includes the step of identifying a group of look ahead bits corresponding to each of the intermediary bits. Each of the groups has a number of look ahead bits, and the particular number of such bits for a given group equals the magnitude of the numeric relative position for the intermediary bit corresponding to the group. Lastly, the method includes the step of determining whether the candidate bit, the last candidate bit, and the intermediary bits match at least the portion of the framing pattern.

BRIEF DESCRIPTION OF THE DRAWINGS

For a more complete understanding of the present invention, and the advantages thereof, reference is now made to the following descriptions taken in conjunction with the accompanying drawings, in which:

FIG. 5a illustrates the patterns of candidate and look ahead bits implemented in the method of FIG. 6 for a pattern requiring examination of three candidate bits;

FIG. 5b illustrates the patterns of candidate and look ahead bits implemented in the method of FIG. 6 for a pattern requiring examination of four candidate bits;

FIG. 7 illustrates a flow chart of the preferred method of searching a frame to locate the framing pattern in accordance with the present invention and implementing a multiple bit framer.

DETAILED DESCRIPTION OF THE PREFERRED EMBODIMENTS

The preferred embodiment of the present invention and its advantages are best understood by referring to FIGS. 1 through 7 of the drawings, like numerals being used for like and corresponding parts of the various drawings.

Figure 2:
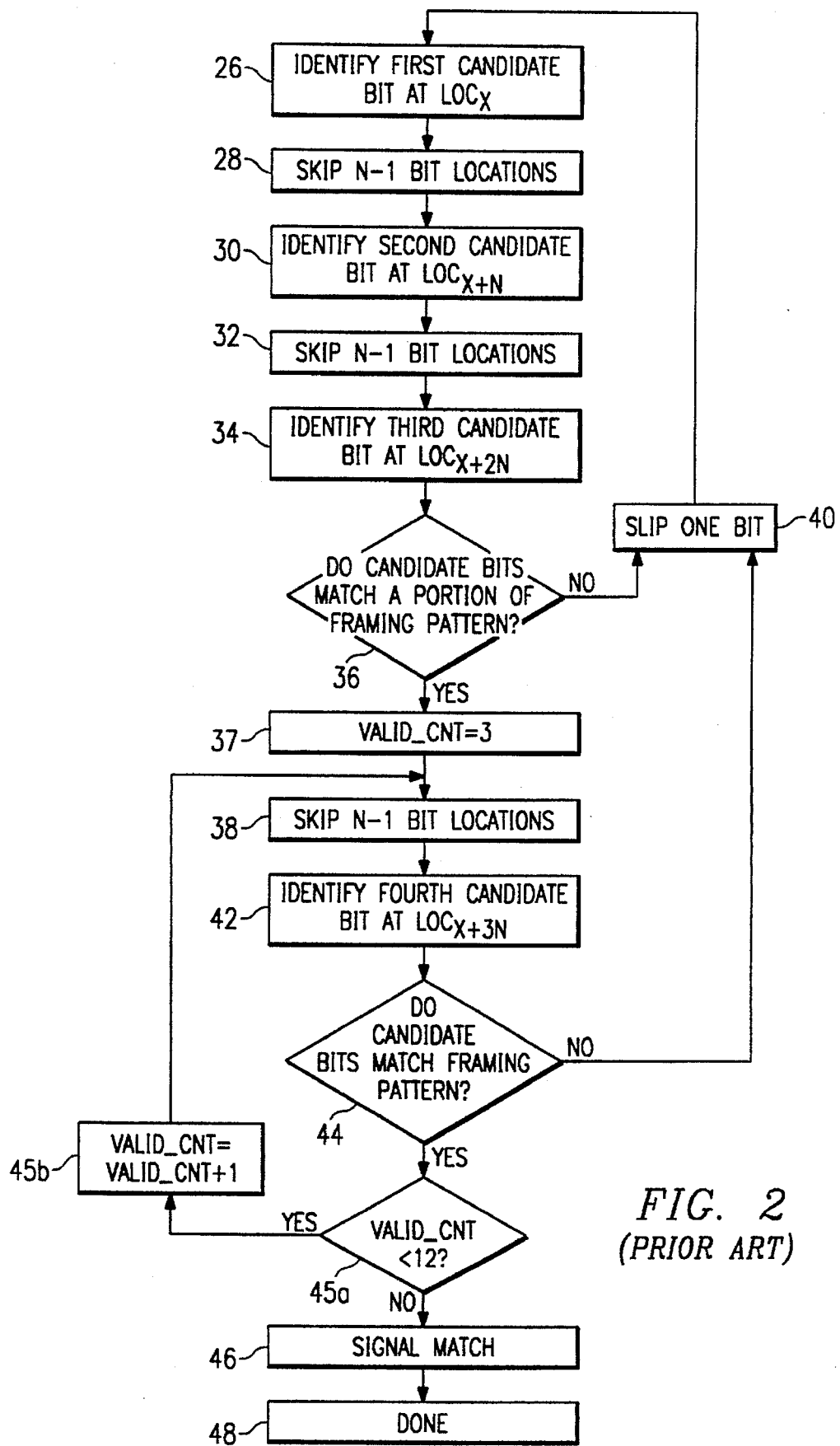
FIG. 2 illustrates a flow chart of a prior art method of searching a frame to locate the framing pattern.
Figure 3:
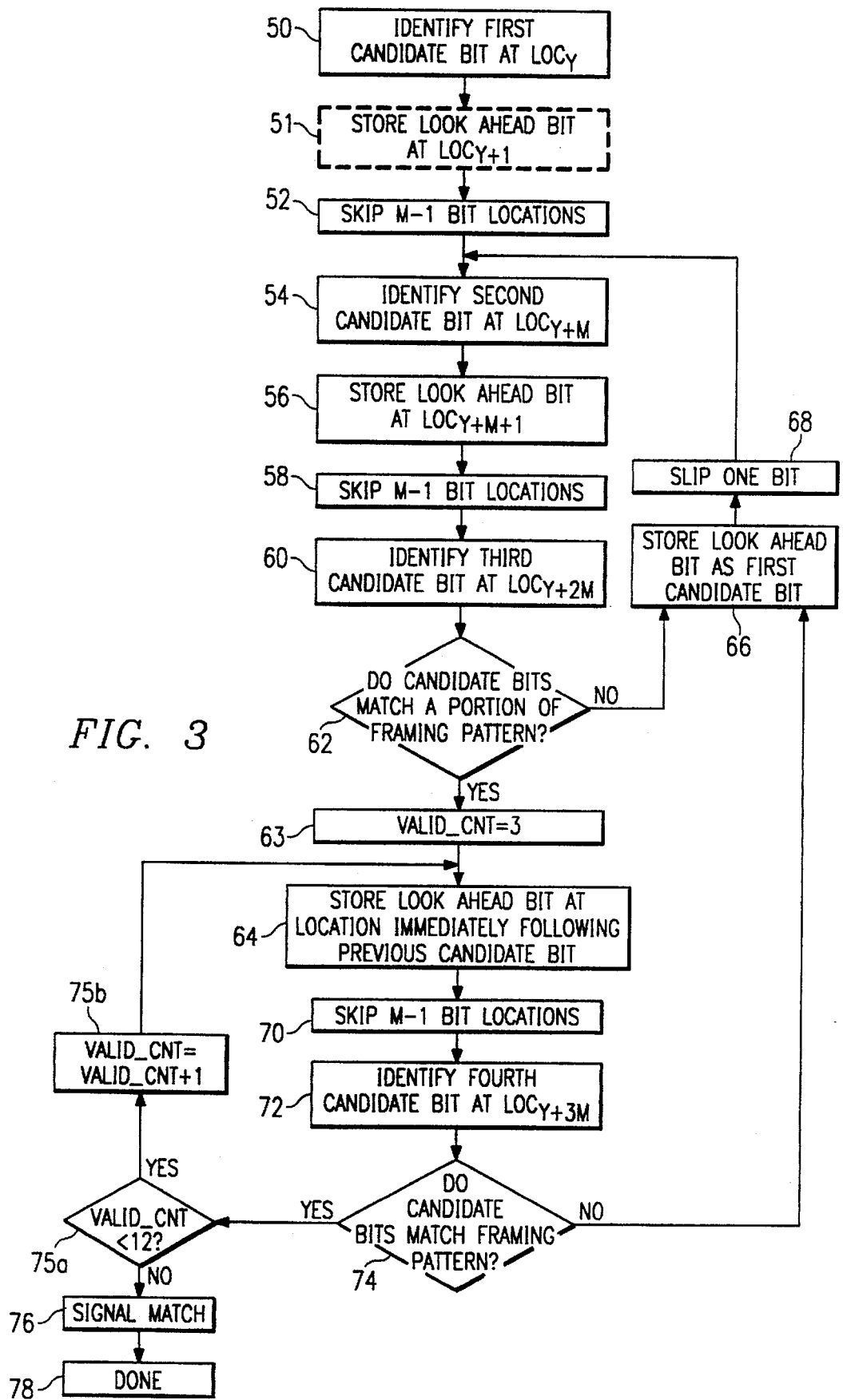
FIG. 3 illustrates a flow chart of one embodiment of a method of searching a frame to locate the framing pattern in accordance with the present invention.

FIG. 3 illustrates a flow chart of a method of searching a frame to locate the framing pattern in accordance with the present invention. The method of FIG. 3 begins in a manner similar to the first three steps of the prior art method of FIG. 2. To avoid confusion between the respective drawings, different variable names are substituted in FIG. 3. Thus, FIG. 3 commences with a step 50 where a first candidate bit is identified at an arbitrary first location, $LOC_Y$. This bit may be copied in a register or the like for subsequent evaluation. Step 51 is shown in phantom because it is optional, and described in greater detail below. Step 52 skips M-1 bits by using a counter as the M-1 bits are serially received. Step 54 identifies a second candidate bit at a location $LOC_{Y+M}$, where the subscript Y+M indicates that the second candidate bit is periodically spaced M bits after the first candidate bit identified in step 50. Like the first candidate bit, the second candidate bit may be copied in a register or the like for subsequent evaluation.

Before skipping the next M-1 bits, however, the method of FIG. 3, in step 56, identifies a look ahead bit. Like the candidate bits, the look ahead bit is preferably copied in a register or the like for subsequent evaluation. In the preferred embodiment, the look ahead bit is the bit immediately following the candidate bit stored in step 54 (i.e., at $LOC_{Y+M}$). Thus, the look ahead bit is at location $LOC_{Y+M+1}$. The function of the look ahead bit is described in greater detail below.

After storing the look ahead bit, the method continues to step 58 which, like step 52, skips M-1 bits, these M-1 bits following the second candidate bit at $LOC_{Y+M}$. Next, step 60 identifies a third candidate bit at a location, $LOC_{Y+2M}$, and this third candidate bit is also stored in a register or the like.

Having stored three candidate bits, and a look ahead bit, the method continues with step 62 wherein a first comparison is performed in the same manner as step 36 in FIG. 2. Thus, step 62 determines whether the three stored candidate bits (from locations $LOC_Y$, $LOC_{Y+M}$, and $LOC_{Y+2M}$) represent a valid portion of a framing pattern. If a valid framing pattern portion is detected, the method continues to step 63 which, as described below, continues the flow to determine if subsequent candidate bits are likewise valid for a given framing pattern. If, however, a valid portion of the pattern is not detected, the method continues to steps 66 and 68 which, as described below, adjust the method and candidate bits to continue the method until the correct framing pattern is located.

As described above, if the method reaches step 63, then the candidate bits encountered thus far represent a valid portion of the pattern in question, and the process continues to determine if a successive bit(s) continues to represent a valid pattern. In particular, step 63 establishes a count of valid bits incurred thus far. For purposes of example, the count is named "VALIDCNT", indicating the total count of successive matching candidate bits. Next, in step 64, and for purposes made clear below, a new look ahead bit is identified, and is preferably copied over the last identified look ahead bit. Thus, when step 64 is encountered for the first time, a new look ahead bit is identified and copied over the look ahead bit previously identified and copied in step 56. Next, step 70, like steps 52 and 58, skips M-1 bits. Thereafter, step 72, like steps 50, 54, and 60, identifies yet another bit, namely, a fourth candidate bit at a location, $LOC_{Y+3M}$, where the subscript Y+3M indicates that the fourth candidate bit is 3*M bits after the first candidate bit identified in step 50.

Step 74, in a manner similar to step 62, determines if the now-accumulated four candidate bits represent a valid framing pattern. If the four bits represent a valid pattern, the method continues to step 75a which, similar to the prior art method described above, begins the determination of whether the pattern of four bits has arrived successive times.

Particularly, step 75a determines if the number of valid successive candidate bits (i.e., VALIDCNT) exceeds twelve; if not, the method continues to step 75b which increments the successive candidate bits. Thereafter, steps 64, 70, 72, 74, 75a, and 75b repeat until twelve valid successive candidate bits are identified. Note that, unlike the prior art, a look ahead bit is obtained in step 64 at the location immediately following each successive candidate bit.

Of course, if an invalid candidate is incurred during the additional repetitions of steps 64, 70, 72, 74, 75a, and 75b, then step 74 detects this occurrence and returns the method to step 66 as described above. On the other hand, if twelve valid successive candidate bits are incurred, the method continues to step 76 where a signal is issued identifying that the correct framing pattern within the serial data has been located and detected (by recognizing that it repeated three times for a total of twelve candidate bits). Accordingly, in step 78, the method stops having achieved its purpose. Again, therefore, once the framing pattern is identified (as represented by the signal of step 78), dependent functions such as frame synchronization may be implemented.

Returning to step 74, note that the method continues to step 66 if the four bits do not match the desired framing pattern. Additionally, as mentioned with reference to step 62, the method also continues to step 66 if the portion of bits (three in the example described) do not match any portion of the desired framing pattern. In either case, having reached step 66, it is recognized that the initially assumed location, $LOC_Y$, was an inaccurate location for the first candidate bit in the framing pattern. Unlike the prior art, however, the method does not immediately proceed with bit slipping and recommencing the method from its beginning after slipping one bit. Instead, in step 66, the most recently copied look ahead bit is now implemented as the new first candidate bit for the next flow through the method of FIG. 3. For example, if registers are used to store each of the candidate and look ahead bits, then in step 66, the bit in the look ahead register is copied, or moved, into the first candidate bit register. Accordingly, it should be appreciated that as of step 66, the new first candidate bit for the next sequence to be analyzed is already obtained.

Next, step 68 causes a one bit slip so that the next successive step, namely, step 54, will identify as the next candidate bit (i.e., the new second candidate bit) the bit located one bit time following the most recently identified candidate bit. Thus, if step 68 is reached from steps 62 and 66, the method slips one bit after the immediately preceding third candidate bit; similarly, if step 68 is reached from steps 74 and 66, the method slips one bit after the immediately preceding fourth candidate bit. In either case, note that the new second candidate bit is M bits following the most recently copied look ahead bit which, after step 66, has become the "first" candidate bit for the next flow of the method of FIG. 3.

One key benefit of the inventive method of FIG. 3 versus the prior art method of FIG. 2 is the saving of time. This benefit is appreciated from a review of the two sequences in view of the DS3 example set forth above. Recall, in FIG. 2, that after a mismatch in step 36, the method recommenced and, therefore, required a total of 340 bit times before it again accumulated and compared three candidate bits with its framing pattern. In contrast, however, consider the inventive method of FIG. 3. Specifically, upon a mismatch in step 62, step 66 immediately identifies a first candidate bit by using the already-stored look ahead bit. Thereafter, in repeating step 54, the second candidate bit is immediately obtained, and after waiting 169 bit times in repeating step 58, the third candidate bit is obtained in the next bit time. Thus, after a total of 170 bit times, three candidate bits are obtained for making the next pattern comparison in step 62. This 170 bit times is one-half that of the 340 bit times required by the method of FIG. 2, thereby considerably reducing the expended time in the framing process.

Note that the same effect occurs in the implementation of steps 64 through 74. Particularly, by storing a look ahead bit in step 64, if a mismatch occurs in step 74, the look ahead bit again is implemented as the first candidate bit for the next succession of candidate bits. Again, therefore, in contrast to the prior art, the method need only wait M bit times before it obtains a total of three candidate bits for the next comparison to the valid portions of the frame pattern sequence in question.

Before proceeding with the preferred circuit implementation, it should be noted that the method of FIG. 3 may be further modified so that a look ahead bit is stored immediately after each candidate bit is stored. Thus, FIG. 3 could include an additional step 51 shown in phantom between steps 50 and 52, where the additional step 51 performed the same function as step 56. This look ahead bit would be subsequently overwritten by the look ahead bit obtained in step 56, but a symmetric method would be formed to more easily facilitate a circuit implementation.

Figure 4:
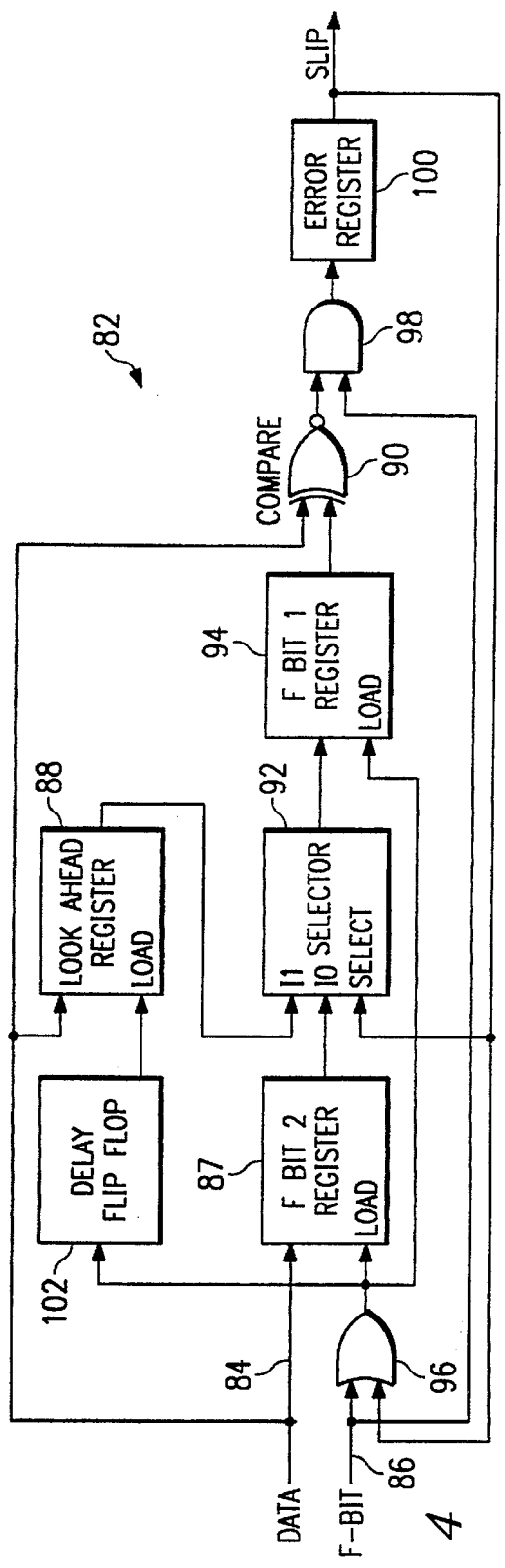
FIG. 4 illustrates a framer circuit as the preferred embodiment for implementing the method of FIG. 3 for a DS3 data frame.

FIG. 4 illustrates a framer circuit denoted generally at 82 as the preferred embodiment for implementing the method of FIG. 3 for a DS3 data frame. Again, therefore, framer circuit 82 evaluates candidate bits for locating the sequences described in connection with Table 1, above (i.e., variations of 1001). Framer circuit 82 includes a data input 84 for receiving all incoming serial bits in a data frame. Circuit 82 further includes a timing input 86 for receiving a bit timing signal, F-bit, which is high during a rising edge of a clock in which the data is a candidate bit (i.e., low for non-candidate bits in the frame). Data input 84 is connected to the data input of a second candidate bit register 87, the data input of a look ahead bit register 88, and a first of two inputs of an exclusive NOR gate 90. The output of second candidate bit register 87 is connected to a first of two data inputs of a selector circuit 92, while the output of look ahead register 88 is connected to the second data input of selector circuit 92. The output of selector circuit 92 is connected to the data input of a first candidate bit register 94. The output of first candidate bit register 94 is connected to the second input of exclusive NOR gate 90.

The timing input 86 of framer circuit 82 is connected to a first of two inputs of an OR gate 96 and to a first of two inputs of an AND gate 98. The second input of AND gate 98 is connected to the output of exclusive NOR gate 90. The output of AND gate 98 is connected to the data input of an error register 100. The output of error register 100 indicates a slip, and is also connected to the second input of OR gate 96 and to the select input of selector circuit 92.

The output of NOR gate 96 is further connected to the load enable input of register 87 and to the D input of a flip flop 102. The output of flip flop 102 is connected to the load enable input of look ahead register 88. Although not shown, it should be understood that flip flop 102 is clocked by a system clock which has the same frequency as the incoming bits of the data frame coupled to data input 84.

The operation of framer circuit 82 to perform the method of FIG. 3 follows. Before proceeding, note that the above-mentioned system clock is connected to clock each of the memory elements of FIG. 4 (i.e., elements 87, 88, 94, 100, and 102). The clock is not shown in FIG. 4, however, in order to simplify the illustration. It should be understood, however, that each of these memory elements operates in response to the rising edge of the system clock.

In operation, timing input 86 receives the periodic signal, F-bit, which signals circuit 82 each time a data bit is to be stored as a candidate bit. Thus, at a time $t_0$, timing input 86 is signaled, thereby enabling the load of register 87; thus, on the next system clock rising edge, register 87 loads the first candidate bit at data input 84 into register 87. The F-bit signal also provides a one to be loaded into flip flop 102 on the same system clock, and flip flop 102 outputs this one to the load enable of look ahead register 88. As a result, on the very next system clock cycle, at a time $t_1$, the clock signal and the one coupled from flip flop 102 to the load enable of register 88 cause look ahead register 88 to load the current bit at data input 84, thereby storing a look ahead bit which is one bit time following the candidate bit stored in register 87 at time $t_0$.

At a subsequent time, $t_2$, timing input 86 is again signaled by F-bit, and thus the next rising system clock loads the second candidate bit at data input 84 into register 87. At the same time, the already-stored first candidate bit in register 87 is transferred through selector circuit 92 and into first candidate bit register 94. On the very next system clock cycle, at a time $t_3$, the immediately following bit at data input 84 is loaded into look ahead register 88, thereby overwriting the look-ahead bit stored at time $t_1$. Thus, as mentioned as an alternative embodiment above, it should be appreciated that circuit 82 stores a look ahead bit immediately after each candidate bit.

At a subsequent time $t_4$, timing input 86 is again signaled by F-bit. On the following system clock, while loading the third candidate bit from data input 84, however, the third candidate bit is compared, via exclusive NOR circuit 90, to the first candidate bit which is now stored in register 94. Note that, for the pattern of interest (i.e., 1001), every other bit will be opposite for a valid pattern. Thus, to perform the comparison step 62 of FIG. 3, only a portion of the candidate bits are examined. Particularly, the exclusive NOR operation of gate 90 determines if a valid pattern is detected by examining every other candidate bit. In other words, as known in the art, the exclusive NOR function provides a high output if the two inputs (i.e., the first and third candidate bits in this example) are the same, and a low output if its inputs are different from one another. Thus, the first and third candidate bits are first evaluated to determine if they are opposite one another and, if so, the second and fourth candidate bits are likewise evaluated to determine if they are opposite one another.

Thus, for an invalid framing pattern portion in a first instance, a high output from exclusive NOR gate 90 combines with the F-bit signal, via AND circuit 98, to provide an error signal high into error register 100, thereby indicating an invalid tested pattern. Accordingly, the error register outputs a high signal at the next clock edge, indicating that the framer circuit 82 should slip to the next bit. In addition, the error register output signals select register 92, thereby loading the contents of look ahead register 88 into first candidate bit register 94. Thus, one skilled in the art should appreciate the implementation of the methodology of FIG. 3 when a sequence of bits does not match the desired pattern.

Oppositely, for a valid framing pattern portion in a second instance, a low output from exclusive NOR gate 90 indicates that the first and third candidate bits are opposite and, hence, a valid portion of the framing pattern has been located and detected. Accordingly, the second candidate bit in register 87 is loaded through selector circuit 92 to first candidate register 94, and the third candidate bit at input 84 is loaded into register 87. Accordingly, by repeating the process above, at a time $t_5$, timing input 86 is again signaled via F-bit, and the fourth candidate bit at data input 84 is compared, via exclusive NOR gate 90, to the second candidate bit now in register 94 in the same manner which the first bit was compared to the third bit described above. Note also, that between the loading of the third and fourth bits, a look ahead bit was again loaded into register 88 immediately after the third candidate bit. Thus, if the comparison of the second and fourth bits indicates an invalid pattern (i.e., those bits match), the look ahead bit again is advanced into register 94, thereby continuing the process in the manner described above.

Having described the above, note that the embodiments of FIGS. 3 and 4 provide increased efficiency over the prior art by substantially reducing the time required before obtaining candidate bits following a mismatch of earlier-acquired candidate bits. While this advantage is achieved for a pattern requiring a minimum of three candidate bits as shown in Table 1, an additional embodiment is now described which provides even greater advantages for framing patterns which require three or more candidate bits for the determination of a pattern match. Particularly, the embodiments described in connection with FIGS. 3 and 4 describe the collection of a single look ahead bit corresponding to each candidate bit, and the overwriting of the previously-gathered look ahead bit. As described below, for patterns requiring a minimum of candidate bits in excess of three bits, an alternative method collects more than one look ahead bit, thereby achieving even greater performance efficiency over the prior art.

In order to demonstrate the additional embodiment, reference is made to following convention:

$$a_1a_2a_3a_4a_5a_6a_7\cdots a_{M-1}b_1b_2b_3b_4b_5b_6b_7\cdots b_{M-1}c_1c_2c_3c_4c_5c_6c_7\cdots c_{M-1}d_1d_2d_3d_4d_5d_6d_7\cdots d_{M-1}e_1e_2e_3e_4e_5e_6e_7\cdots e_{M-1}f_1f_2f_3f_4f_5f_6f_7\cdots f_{M-1}$$ Ex. 1

Figure 1:
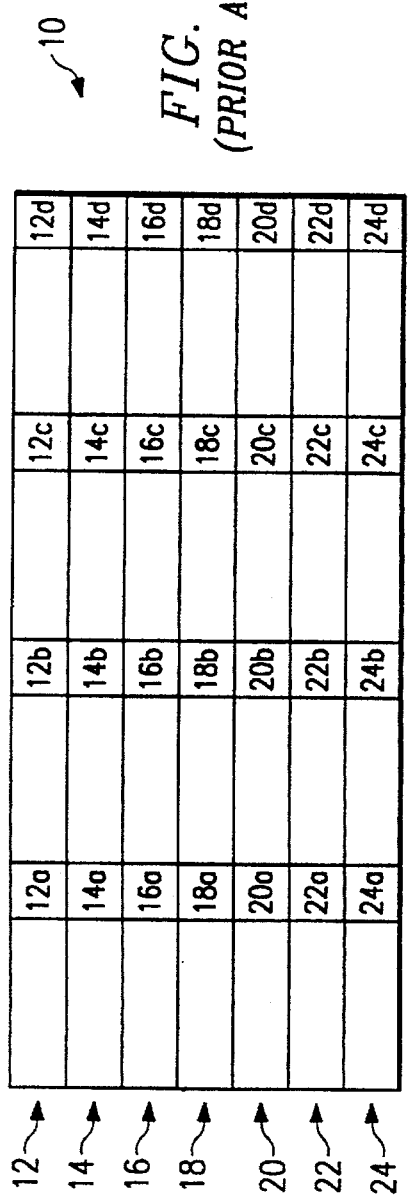
FIG. 1 illustrates a prior art data frame of serial bits.

In Ex. 1, each lowercase letter is intended to illustrate successive serial bits in a data frame, such as data frame 10 shown in FIG. 1. The subscripts are intended to designate the serial nature of the bits, and fixed separation of the bits; in other words, $b_1$ follows $a_1$ by a fixed number M of bits, as does $c_1$ following $b_1$, and so forth. Further, the fixed number of bits separating letters having like subscripts is the same number as the distance between identifier bits shown in FIG. 1, such as between location 12a and 12b, 12b and 12c, and so forth. Thus, given the method described in FIG. 3, above, bits $a_1$, $b_1$, and $c_1$ are first identified as candidate bits and examined to determine if they match a portion of the framing pattern. If a match occurs, $d_1$ is obtained to determine if it also matches the expected bit in the framing pattern. If a match does not occur, $b_2$, as a look ahead bit, is combined with $c_2$ and $d_2$ to determine if those three candidate bits match a portion of the framing pattern, and so on. Note for convention sake, in this document bits are referred to in the order incurred; for example, for the sequence $a_1b_1c_1$, $a_1$ is referred to herein as the "first" bit, while $c_1$ is the "last" bit, and so forth.

Figure 5C:
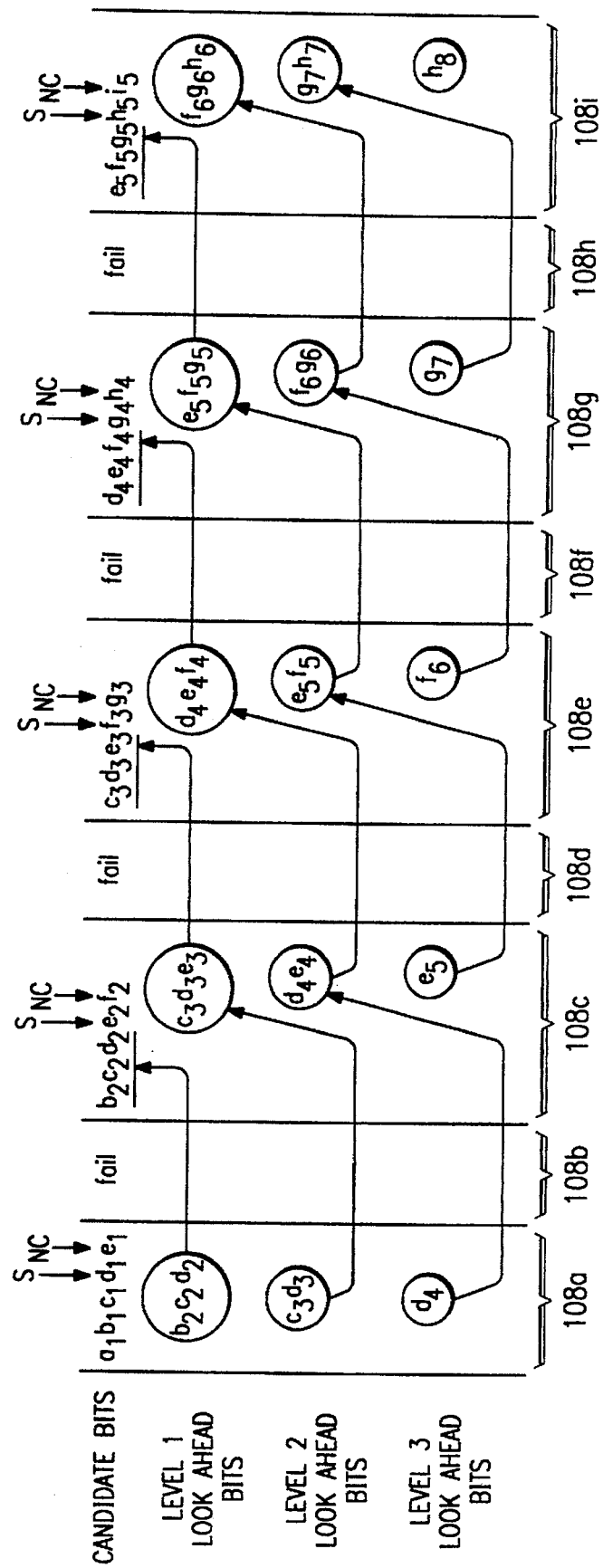
FIG. 5c illustrates the patterns of candidate and look ahead bits implemented in the method of FIG. 6 for a pattern requiring examination of five candidate bits.

Given the above, reference is made to FIGS. 5a–5c which use the convention of Ex. 1 and illustrate the patterns 104, 106, and 108 of candidate bit examination for a minimum of three candidate bits, four candidate bits, and five candidate bits, respectively. Pattern 104 of FIG. 5a is first discussed to illustrate the convention of the figure, and to show how bits are examined in accordance with the method of FIG. 6 discussed in detail below. Patterns 106 and 108 (FIGS. 5b and 5c, respectively) further illustrate the additional embodiment of the method of the present invention wherein multiple look ahead bits are collected to improve framing pattern detection for data formats which collect three or more bits before performing a comparison.

With reference to FIG. 5a, pattern 104 illustrates the sequence of bits examined for three successive mismatches of a pattern requiring a minimum of three successive candidate bits. Pattern 104 commences with an instance 104a wherein the first three candidate bits, $a_1b_1c_1$, are collected for comparison to a valid pattern, such as those shown in Table 1. Because a comparison is made in instance 104a, it and similar instances are hereafter referred to as a comparison instance.

Underneath the candidate bits are shown first-level look ahead bits. As described below, for patterns, such as 106 and 108, requiring more than three bits to be examined at once, more than one level of look ahead bits are preferred. Returning to pattern 104, however, note that a single look ahead bit is obtained for each candidate bit between the first candidate bit (i.e., $a_1$) and the last candidate bit (i.e., $c_1$). Again, the look ahead bit is the bit immediately following the candidate bit in issue, so in instance 104a, the look ahead bit is $b_2$.

Instance 104b illustrates a mismatch, namely, that bits $a_1b_1c_1$ do not match the portion of the valid framing pattern at issue. Consequently, in comparison instance 104c, the look ahead bit from comparison instance 104a is carried forward as the first candidate bit. Moreover, a slip bit is identified (as indicated by "S") and, as shown in the method of FIG. 3, is the bit immediately following the last candidate bit of instance 104a; hence, the slip bit is $c_2$ which immediately follows $c_1$. Finally, a new candidate bit (as indicated by "NC") is obtained, and recall from above the new candidate bit is the fixed distance, M, from the slip bit; hence, the new candidate bit in comparison instance 104c is $d_2$ which is the fixed distance from the slip bit, $c_2$. Note also that a new look ahead bit is obtained immediately following the slip bit (which is the bit in instance 104c between the first candidate bit, $b_2$, and the last candidate bit, $d_2$); thus, $c_3$ is obtained as the look ahead bit for slip bit $c_2$.

Next in pattern 104, another mismatch occurs at instance 104d. Thus, in comparison instance 104e, a new set of candidate bits are combined to form the portion to be examined, namely: (1) the look ahead bit from instance 104c, $c_3$, is carried forward as the first candidate bit; (2) a slip bit, $d_3$, is obtained as the second candidate bit; and (3) a new and third candidate bit, $e_3$, is obtained at a fixed distance, M, from the slip bit, $d_3$. Note also that a new look ahead bit is obtained immediately following the slip bit; thus, $d_4$ is obtained as the look ahead bit for slip bit $d_3$. The pattern again repeats when a mismatch occurs in instance 104f, thereby creating the last set of candidate bits illustrated in comparison instance 104g.

With reference to FIG. 5b, pattern 106 illustrates the sequence of bits examined for a pattern requiring a minimum of four successive candidate bits and, further, the sequence for four successive mismatches. As apparent and detailed below, where the minimum number of candidate bits exceeds three, more than one look ahead bit is obtained for certain candidate bits to produce even greater efficiency over that illustrated above.

Pattern 106 commences with a comparison instance 106a wherein the first set of four candidate bits, $a_1b_1c_1d_1$, are collected. Again, underneath the candidate bits are shown look ahead bits. However, because pattern 106 requires more than three candidate bits to be examined at once, more than one level of look ahead bits is preferred. Particularly, as demonstrated by FIGS. 5a–5c, for each candidate bit beyond the minimum of three, an additional look ahead level is preferred. This process is demonstrated by the remaining discussion of FIGS. 5a–5c.

The first look ahead level for comparison instance 106a, as in the case for comparison instance 104a of FIG. 5a, includes a single look ahead bit for each bit between the first candidate bit (i.e., $a_1$) and the last candidate bit (i.e., $d_1$). For purposes of this application, these candidate bits between the first and last candidate bits are hereafter referred to as "intermediary bits." Thus, look ahead bits $b_2$ and $c_2$ are obtained corresponding to intermediary candidate bits $b_1$ and $c_1$.

The second look ahead level for comparison instance 106a includes an additional look ahead bit, $c_3$, corresponding to the next-to-last candidate bit (i.e., $c_1$) of the given instance 106a. The purpose of the additional level of look ahead is made apparent below by progressing through the sequence of events for pattern 106.

Instance 106b illustrates a mismatch, namely, that bits $a_1b_1c_1d_1$ do not match the portion of the valid framing pattern at issue. Consequently, the two look ahead bits from the first look ahead level of instance 106a are carried forward to form the first two candidate bits for comparison instance 106c. Also in comparison instance 106c, a slip bit is identified (indicated by "S") which, by previous definition, is the bit immediately following the last candidate of instance 106a; hence, the slip bit is $d_2$ which immediately follows $d_1$. Finally, a new candidate bit (indicated by "NC") is obtained which, by previous definition, is the candidate bit at a fixed distance, M, following the slip bit; hence, the new candidate bit in comparison instance 106c is $e_2$ which is the fixed distance, M, from the slip bit, $d_2$.

New look ahead bits are also identified in comparison instance 106c. However, unlike comparison instance 104c wherein only one look ahead bit was obtained, two look ahead bits are obtained in comparison instance 106c. The first look ahead bit is, by previous definition, the bit immediately following the slip bit at issue. Thus, the first look ahead bit is $d_3$. The second look ahead bit immediately follows the first look ahead bit and, thus, is $d_4$. The reasons for obtaining two look ahead bits rather than one are apparent from the following discussion of the remainder of FIG. 5b.

Note also, only look ahead bits corresponding to the slip bit, $d_2$, are obtained in comparison instance 106c. The remaining look ahead bits per comparison instance are transferred from higher look ahead levels. Thus, in comparison instance 106c, the level 2 look ahead bit from comparison instance 106a is combined with the level 1 look ahead bit which is obtained during instance 106c, namely, $d_3$. Accordingly, the total level 1 look ahead bits in instance 106c are $c_3d_3$, thereby presenting an accumulation of look ahead bits corresponding to each of the intermediary bits for that comparison instance (i.e., corresponding to $c_2$ and $d_2$). As borne out below, the same is true for all subsequent comparison instances. Thus, only in the initial instance 106a are all look ahead bits obtained for each intermediary bit. Thereafter, and for reasons more clear below, only look ahead bits corresponding to the newly obtained slip bit are preferred, while the look ahead bits corresponding to the remaining intermediary bits are carried forward from previous and higher look ahead levels.

Next, another mismatch occurs at instance 106d. Thus, in comparison instance 106e, a new set of candidate bits are combined to be compared to the framing pattern portion at issue. Note, in order to obtain the appropriate first of the candidate bits for comparison instance 106e, the second-level look ahead bit from two comparison instances earlier, namely, comparison instance 106a, is carried through the first level of look ahead of comparison instance 106c rather than originating from the immediately preceding comparison instance 106c. Moreover, the second of the new set of candidate bits for comparison instance 106e is obtained by carrying forward the first-level look ahead bit from the immediately preceding comparison instance 106c. Thereafter, the additional two candidate bits, $e_3$ and $f_3$, are obtained in a manner similar to comparison instances 104b, 104d, 106c, that is, by obtaining a slip bit and a new candidate bit M bits later. In addition, two-levels of look ahead bits, $e_4$ and $e_5$, are obtained corresponding to the current slip bit, $e_3$.

From the above, one skilled in the art should appreciate the additional benefit created by the method of storing a second-level look ahead bit. In particular, the second level look ahead bit is available for a comparison instance occurring two comparison instances after the instance during which a given second level look ahead bit is obtained. For example, following instance 106a in which a second look ahead bit is obtained, a first comparison occurs in instance 106c. If a mismatch occurs, a second comparison occurs in comparison instance 106e, and the second look ahead bit obtained two comparisons earlier (i.e., in comparison instance 106a) is still available and is used as a candidate bit for comparison instance 106e. Thus, because look ahead bits are not immediately overwritten as in the method of FIG. 3, and because additional levels of look ahead are retained, the look ahead bits are available for mismatches which occur more than one comparison instance later.

Indeed, if the second-level look ahead bit(s) were not maintained, then the first candidate bit in comparison instance 106e would be $d_3$, that is, the first-level look ahead bit obtained from the immediately preceding comparison instance 106c. Thus, in order to obtain a total of four candidate bits as needed, the second candidate would be the slip bit, but then two additional candidate bits would have to be obtained, thereby expending 2*M bit times to acquire such bits. Particularly, the third candidate bit in instance 106e would arrive at 1*M bit time following the slip bit, and the fourth candidate bit in instance 106e would arrive at 2*M bit times later. To the contrary, under the present invention, by implementing the preferred method of additional levels of look ahead bits, only 1*M bit time is necessary to obtain the fourth candidate bit in instance 106e (i.e., $f_3$) because the first two candidate bits are already present due to the earlier acquisition of look ahead bits (and the third candidate is immediately obtained as the slip bit).

The same beneficial result is again illustrated when continuing with process 106. Particularly, following a mismatch in instance 106f, a fourth set of candidate bits are examined in comparison instance 106g. The first candidate bit of the fourth set, $d_4$, is again carried forward from the second level of look ahead of comparison instance 106c and through the first level of look ahead of comparison instance 106e. Again, therefore, a second level look ahead bit is available for a comparison that occurs two comparisons later as opposed to the immediately following comparison. The remainder of the candidate bits for comparison instance 106g are obtained in the same manner as comparison instance 106e, namely: (1) the second candidate bit, $e_4$, is the first-level look ahead obtained during the immediately preceding comparison instance 106c; (2) the third candidate bit, $f_4$, is the slip bit which is M bits following the preceding look ahead bit, $e_4$;

and (3) the fourth candidate bit, $g_4$, is a new candidate bit which is M bits following the slip bit. Again, therefore, the method illustrates the benefit that only 1*M bit times are expended before all candidate bits are obtained for making the comparison of instance 106g.

FIG. 5c illustrates pattern 108 which depicts the sequence of bits examined for a pattern requiring a minimum of five candidate bits and, similar to FIGS. 5a–5b, for successive mismatch instances. FIG. 5c is included to demonstrate that the method now explained in connection with FIGS. 5a and 5b expands to a sequence having any number of minimum candidates which are examined at once.

Given that FIG. 5c is comparable to FIG. 5b, with the former having an additional candidate bit per comparison, only a brief review of the process of FIG. 5c is described below from which a person of skill in the art should recognize the analogous operation given the above. Thus, pattern 108 commences with a comparison instance 108a wherein the first set of five candidate bits, $a_1b_1c_1d_1e_1$, are collected. Underneath the candidate bits are shown look ahead bits. Note that pattern 108 requires three levels of look ahead bits. Indeed, having explained the carry forward operation of the look ahead bits, and given the format shown in FIGS. 5a–5c, note that the number of look ahead levels is preferably equal to the number of intermediary bits for a given pattern. For example, pattern 108 involves five candidate bits and, therefore, three intermediary bits; consequently, pattern 108 includes three levels of look ahead bits. Reference is made back to FIGS. 5a and 5b which further illustrate this point, namely, that one intermediary bit (FIG. 5a) benefits from one level of look ahead bits, and two intermediary bits (FIG. 5b) benefit from two levels of look ahead bits.

Instance 108a further illustrates another inventive technique of the preferred method. Particularly, during the first comparison instance of the numerous instances, note that the number of look ahead bits obtained for a given candidate bit is equal to the relative numeric position of the candidate as an intermediary bit. For example, the next-to-last candidate bit, $d_1$, is the third (i.e., number three) intermediary bit; accordingly, three levels of look ahead bits (i.e., $d_2$, $d_3$, and $d_4$) are obtained during the initial comparison instance 108a. Similarly, the bit preceding the next-to-last candidate bit, $c_1$, is the second (i.e., number two) intermediary bit; accordingly, two levels of look ahead bits (i.e., $c_2$ and $c_3$) are obtained during comparison instance 108a. Finally, for the first (i.e., number one) intermediary bit, $b_1$, one level of look ahead bits (i.e., $b_2$) is obtained during instance 108a. Indeed, reference is made back to FIG. 5b and 5a which illustrate the same principle in the initial comparison instances 106a and 104a, respectively. For example, in the initial instance 106a, for the first intermediary bit, $b_1$, one level of look ahead bits (i.e., $b_2$) is obtained and for the second intermediary bit, $c_1$, two levels of look ahead bits (i.e., $c_2$ and $c_3$) are obtained. Further, in the initial comparison instance 104a, because only one intermediary bit exists (i.e., $b_1$), only one level of look ahead bits is obtained.

Pattern 108 further illustrates the carry forward benefits of multiple look ahead levels, and multiple look ahead bits within those levels. For example, following a mismatch in comparison instance 108b, five new candidate bits are combined for comparison instance 108c. The first three of these candidate bits are readily available because they were stored as the first level look ahead bits in instance 108a (i.e., bits $b_2$, $c_2$, and $d_2$). The fourth candidate bit is the slip bit, $e_2$, which immediately follows the last candidate of comparison instance 108a. The fifth and final candidate bit, $f_2$, is available 1*M bit times later.

Again, therefore, regardless of the number of candidate bits, the method demonstrated in FIGS. 5a–5c permits each comparison after the initial comparison to be made after a delay of only 1*M bit times. Moreover, this benefit is multiplied with each increase in the number of candidate bits at issue. For example, for the case of five candidate bits, the prior art would obtain one slip bit, but then require 4*M bit times before the set of candidates for the next comparison was accumulated. In contrast, the present invention reduces the corresponding time to 1*M bit times and, thus, clearly increases efficiency in frame pattern recognition.

Comparison instance 108c also illustrates the principle set forth above applying to comparisons after the initial comparison, namely, that only look ahead bits corresponding to the last intermediary bit are accumulated for a given comparison instance, while the remaining look ahead bits are carried forward from previous (and higher) look ahead levels. Thus, for comparison instance 108c, $e_2$ is the last intermediary bit of three intermediary bits; hence, three levels of look ahead bits are accumulated for $e_2$ (i.e., $e_3$, $e_4$, and $e_5$). Moreover, $e_3$, the newly obtained level 1 look ahead bit, is combined with the level 2 look ahead bits from the previous comparison instance 108a, namely, $c_3d_3$, thereby forming an accumulation of look ahead bits, $c_3d_3e_3$, corresponding to each of the intermediary bits of comparison instance 108c (i.e., $c_2d_2e_2$). As still a further illustration of this carry forward aspect of the invention, note that the level 3 look ahead bit from comparison instance 108a is combined with the level 2 look ahead bit of comparison instance 108c; this combination is then further carried forward and combined with the level 1 look ahead bit of comparison instance 108e, thereby forming an accumulation of look ahead bits, $d_4e_4f_4$, corresponding to each of the intermediary bits of comparison instance 108e (i.e., $d_3e_3f_3$).

Figure 5D:
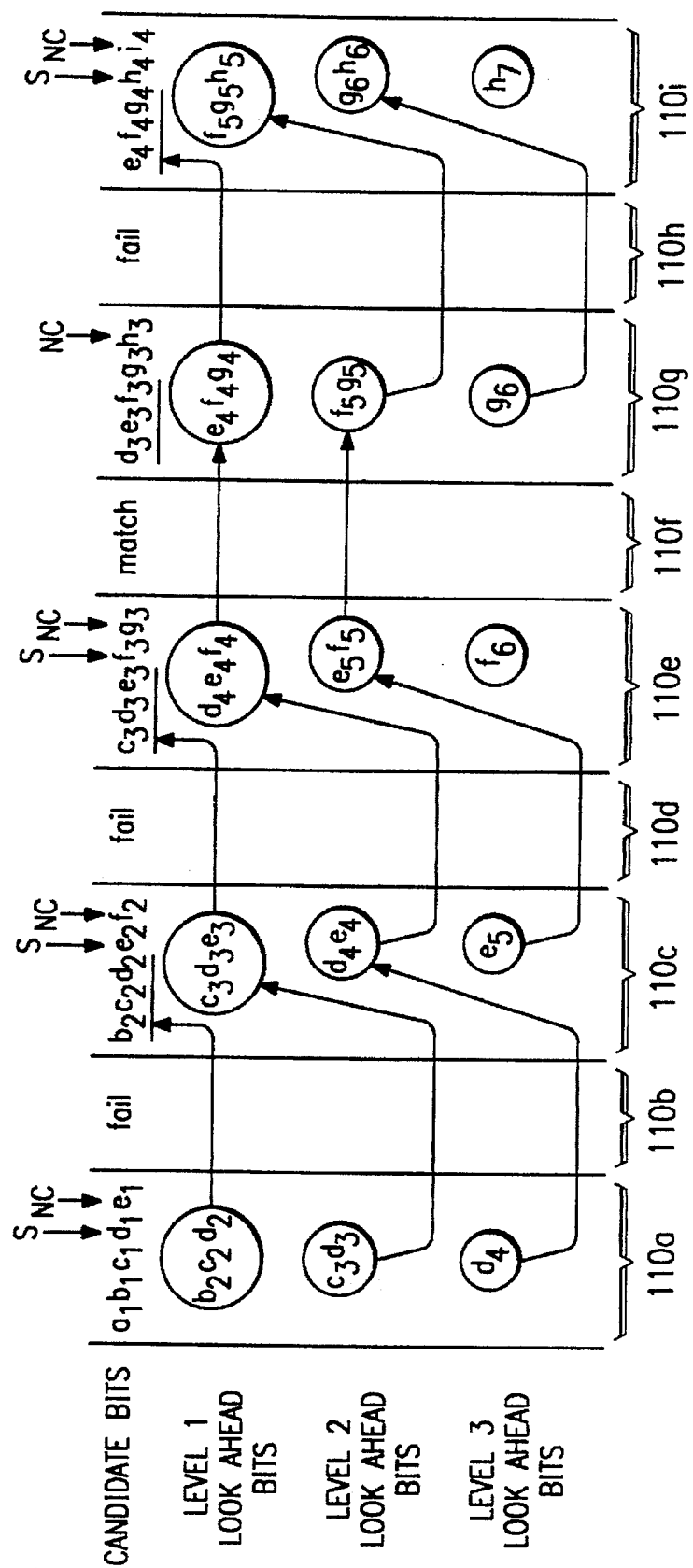
FIG. 5d illustrates the patterns of candidate and look ahead bits implemented in the method of FIG. 6 for a pattern requiring examination of five candidate bits and including a match instance.

FIG. 5d illustrates a pattern 110 which is similar to that of FIG. 5c in that the pattern requires a minimum of five candidate bits; however, for purposes of illustration, FIG. 5d further demonstrates the sequence where a match occurs amongst a series of mismatches. Instances 110a through 110e are not discussed in detail because they correspond in operation to instances 108a through 108e of FIG. 5c and, thus, the reader is referred to the above.

In instance 110f, however, a match occurs, that is, the candidate bits in comparison instance 110e (i.e., $c_3d_3e_3f_3g_3$) are found to match a given sequence (such as that demonstrated in Table 1, but with five bits instead of three). Although not shown, as stated above, a counter is incremented to indicate a successful match for later determining whether a sufficient number of successive matches have occurred. Further, again a number of look ahead bits corresponding to the last candidate bit (i.e., $g_3$) are stored, where the number equals the number of intermediary bits (i.e., three intermediary bits and, hence, $g_4$, $g_5$, and $g_6$). However, unlike the mismatch instances, in instance 110g, the level 1 look ahead bits from instance 110e are not the first three candidate bits in instance 110g, and no slip bit is necessary. Instead, the next candidate bit (i.e., $h_3$) is simply the bit which is M bits following the most recently obtained candidate bit (i.e., $g_3$). Thus, in comparison instance 110g, the sequence $d_3e_3f_3g_3h_3$ is compared to the pattern at issue. Note also that, because of the match in instance 110f, the level 1 look ahead bits from the previous comparison instance 110e are transferred to the level 1 look ahead of instance 110g, and shifted such that the first of the look ahead bits (i.e., $d_4$) is dropped and the new last look ahead bit (i.e., $g_4$) is the new look ahead bit from level 1 of comparison instance 110g. This transferring and shifting effect preferably occurs at all levels of look ahead when a match occurs. Thus, note further that the level 2 look ahead bits from the previous comparison instance 110e are transferred to the level 2 of instance 110g, and shifted such that the first of the look ahead bits (i.e., $e_5$) is dropped and the new last look ahead bit ($g_5$) is the new look ahead bit obtained in level 2 of comparison instance 110g.

In instance 110h, the comparison fails and, thus, the pattern continues as shown, and in a manner similar to that discussed in connection with FIG. 5c, above. Again, therefore, the level 1 look ahead bits from instance 110g become the new first three candidate bits for instance 110i, and so forth.

Figure 5E:
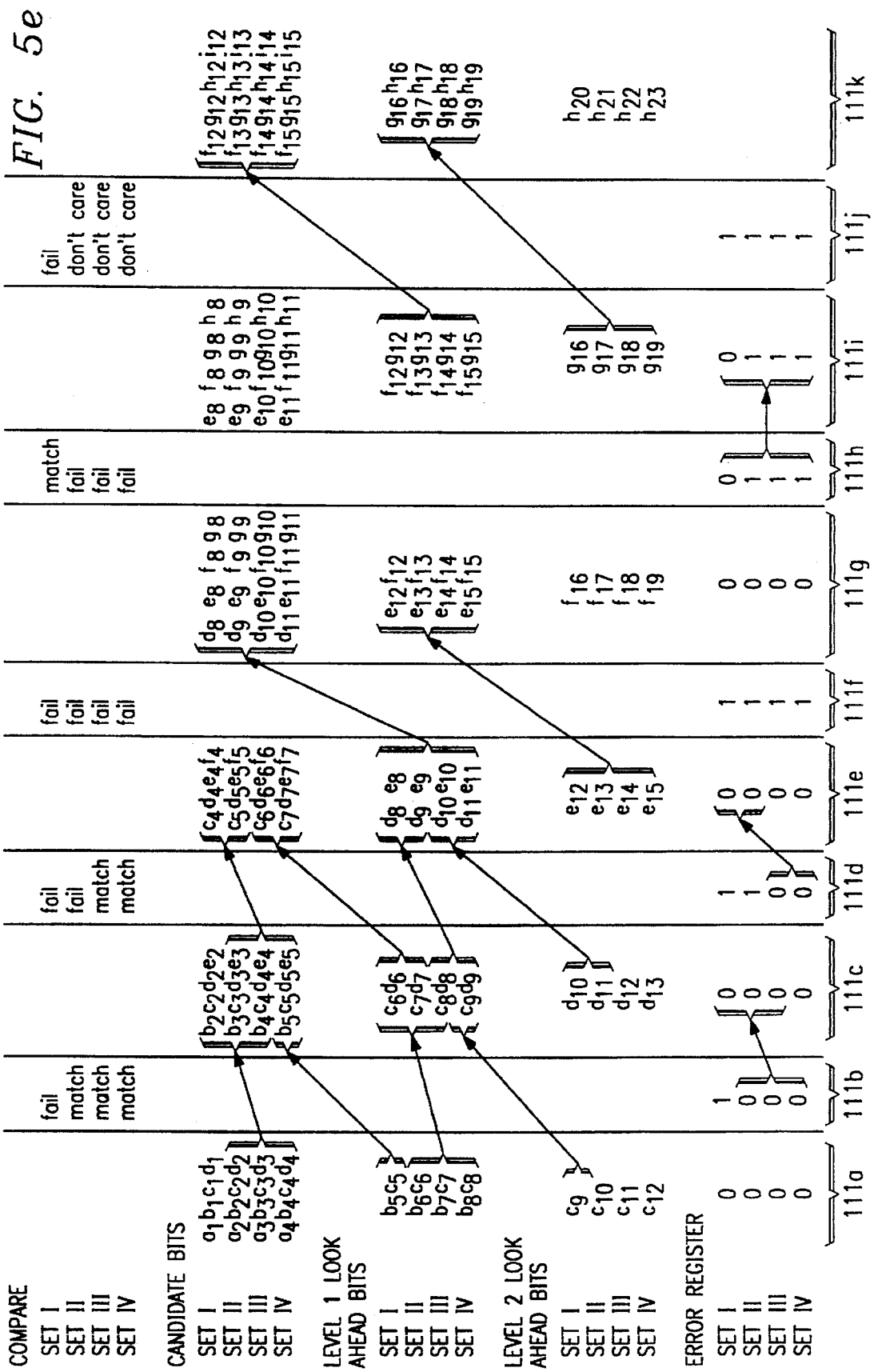
FIG. 5e illustrates the patterns of candidate and look ahead bits implemented in the method of FIG. 6 for a multiple bit framer, wherein the framer evaluates four sets of bits, each set having four candidate bits.

FIG. 5e illustrates a pattern 111 in a manner similar to FIGS. 5a–5d, but further demonstrates the application of the present invention to multiple bit framers. Before proceeding with the implementation, an overview of the grouping and sets involved in a multiple bit framer is instructive.

As mentioned above under the Background of the Invention, multiple bit framers operate to evaluate numerous sets of candidate bits at once in contrast to a single set evaluated by a one bit framer. Further, each set contains a given number of candidate bits. FIG. 5e demonstrates the example of a four bit framer evaluating four candidate bits per set. Thus, given the convention of Ex. 1, initially four groups of bits are collected, where each group includes four bits as follows:

Group I: $a_1 a_2 a_3 a_4$
Group II: $b_1 b_2 b_3 b_4$
Group III: $c_1 c_2 c_3 c_4$
Group IV: $d_1 d_2 d_3 d_4$ As stated above, sets of candidates are then accumulated by taking bits from each group having the same corresponding position. Thus, four sets of candidate bits are formed as follows:

Set I: $a_1 b_1 c_1 d_1$
Set II: $a_2 b_2 c_2 d_2$
Set III: $a_3 b_3 c_3 d_3$
Set IV: $a_4 b_4 c_4 d_4$

In view of the above, in a multiple bit framer, all of Sets I through Set IV are simultaneously analyzed, that is, the candidates of each set are compared against the framing pattern at issue.

Having overviewed multiple bit framing, reference is now made to FIG. 5e to illustrate the application of the present invention to multiple bit framing. Pattern 111 includes numerous instances as in FIGS. 5a–5d. With the addition of multiple sets of consideration, multiple sets of look ahead bits are created in each level of look ahead. Further, an error register also having sets is included which records the past history of matches/mismatches for each respective candidate set as discussed below.

Referring to instance 111a, note that the number of sets of look ahead bits for each level of look ahead bits is the same as the number of sets of candidate bits. Thus, in the example of FIG. 5e, there are four sets of candidate bits and, thus, four sets of look ahead bits in each level of look ahead. Further, as is the case in the single bit framer, above, the number of levels of look ahead bits for a given intermediary bit equals the relative numeric position of that respective intermediary bit. Thus, in Set I, $b_1$ is the first intermediary bit and, thus, has one look ahead bit, $b_5$. Similarly, in Set I, $c_1$ is the second intermediary bit and, thus, has two look ahead bits, $c_5$ and $c_9$.

Note that the corresponding look ahead bits, $b_5 c_5$, do not immediately follow the first set of intermediary bits, $b_1 c_1$.

Instead, $b_5 c_5$ are four bits after $b_1 c_1$. This aspect occurs because the bits, $b_2 c_2$, immediately following the intermediary candidate bits, are part of Set II of candidate bits and, thus, need not be considered in the sequential analysis of candidate Set I. Thus, when implementing the present invention in the multiple bit framer, a look ahead bit follows the corresponding intermediary bit by the number of candidate sets rather than immediately following the intermediary candidate bits. One skilled in the art will also recognize that for a Z bit framer using the present invention, a look ahead bit would be Z bits following the intermediary bit.

Moreover, for intermediary bits having more than one look ahead bit (i.e., for intermediary bits having a relative numeric position greater than one), each look ahead bit is a multiple of Z bits following the intermediary bit where, again, Z is the size of the bit framer (e.g., 4 for a four bit framer). For example, intermediary bit $c_1$ is the second intermediary bit; thus, in accordance with the above, two look ahead bits are stored for $c_1$. As shown immediately above, the first corresponding look ahead bit, $c_5$, is Z bits after $c_1$, where Z is the size of the bit framer. However, the second corresponding look ahead bit, $c_9$, is 2*Z bits after $c_1$. Thus, one skilled in the art will also recognize that for a Z bit framer using the present invention, each look ahead bit is a multiple of Z bits following the intermediary bit and, again, the number of look ahead bits (as well as the multiple of Z) corresponds to the relative numeric position of the intermediary bit.

As detailed below, for multiple bit framers, note that although look ahead bits correspond to intermediary bits for a given comparison instance, in the preferred embodiment, the look ahead bits are moved in a fashion such that there is not ongoing correspondence between one set of candidate bits and one set of look ahead bits; in other words, the second set of look ahead bits in one instance may be moved to be part of the second, third, or fourth set of candidate bits in a subsequent instance, and so forth as illustrated by the following discussion.

Instance 111b illustrates a mismatch in candidate Set I, namely, that bits $a_1 b_1 c_1 d_1$ of candidate Set I do not match the portion of the valid framing pattern at issue. In addition, instance 111b illustrates a match in candidate Sets II, III, and IV. Thus, the error register sets record these events, storing a logical 1 for a mismatch and a logical 0 for a match. Particularly, Set I of the error register records a logical 1 indicating the mismatch of candidate Set I, and Sets II through IV of the error register remain a logical 0 indicating the match of candidate Sets II through IV. As detailed below, the subsequent instances are later controlled in accordance with the records reflected by the error register.

In the preferred embodiment, the contents of the error register control the shifting and/or transferring of both candidate bits and look ahead bits between sets. If a mismatch occurs in candidate Set I, the framer discards candidate Set I and each successive candidate set which also mismatched. In other words, if only Set I is a mismatch, it is discarded. If, however, Sets I and II both mismatch, then both are discarded, and so forth. Moreover, a total of D candidate sets are discarded, until a matching candidate set, if any, is encountered.

Once a matching candidate set is encountered, the framer adjusts the remaining bits by shifting and/or transferring bits so that a part of the next successive matching candidate set, if any, becomes part of the first candidate set in the immediately following comparison instance. Note the definition of shifting and transferring as used herein. By "shifting", it is meant that the oldest bit in a set is discarded. By "transferring", it is meant that a set in one instance is moved (either in part, if shifted, or as a whole) to a subsequent instance. As illustrated below, a transfer may be from candidate set to candidate set, from look ahead set to look ahead set, or from look ahead set to candidate set. Each of these principles is demonstrated by way of examples, below.

Given the above, in instance 111b, candidate Set I is a mismatch. Thus, the framer discards candidate Set I and operates (by shifting and transferring) so that a part of the next successive matching set, as indicated by the error register bits, becomes a part of candidate Set I for the next comparison instance. Thus, in the example of instance 111b, Set II of the error register indicates that candidate Set II of instance 111a is the first matching candidate set. Accordingly, a part of candidate Set II of instance 111a becomes a part of candidate Set I of instance 111c. Particularly, $a_2 b_2 c_2 d_2$ is shifted to discard the oldest bit, thereby leaving $b_2 c_2 d_2$. This shifted bit sequence is transferred to candidate Set I of instance 111c, and is joined by a new candidate bit, $e_2$, which is M bits following the last existing candidate bit, $d_2$. Note that a similar adjustment is made to all candidate sets following the first successfully matching candidate set, even if those latter candidate sets caused a mismatch. Thus, in the current example, candidate Sets III and IV of instance 111a follow the first successfully matching candidate Set II and, thus, those Sets are shifted and transferred to become candidate Sets II and III for instance 111c.

Regarding the shifting and transferring of the candidate sets, one skilled in the art will appreciate that after such operations a given candidate Set or Sets which mismatched are ruled out from further consideration as later bits arrive as part of that set. In other words, given the example above, if $a_1 b_1 c_1 d_1$ mismatches, the invention operates to avoid consideration of $b_1 c_1 d_1 e_1$ because, by definition, if $a_1 b_1 c_1 d_1$ is a mismatch in comparison with the valid framing pattern, then so will be the same pattern after dropping the oldest bit (i.e., $a_1$) and adding a new candidate (i.e., $e_1$) M bits after the last candidate. Moreover, by retaining a part of the first successively matching candidate set, additional consideration may be made of that set as new bits (M bits later) are added to determine whether, with those additional bit(s), the candidate set remains a match given the valid framing pattern. In other words, given the example above, since $a_2 b_2 c_2 d_2$ matches the framing pattern, then the invention continues by considering whether that set, given a new bit (i.e., $e_2$) M bits later, also matches the framing pattern at issue.

Returning to the example of instances 111a through 111c, and having identified Sets I through III for instance 111c, the bits for candidate Set IV also must be identified. Toward that end, Set I of look ahead level 1 from instance 111a is transferred to candidate Set IV of instance 111c. Moreover, a slip bit, $d_5$, is added to the transferred bits. Lastly, a new candidate bit, $e_5$, is included in the new candidate Set IV, where $e_5$ is M bits following the slip bit. Thus, in instance 111c, one slip bit is required. Note also that this example demonstrates that the number of slip bits for a given instance equals D, that is, the number of candidate sets which are discarded. In other words, one candidate set (i.e., Set I) is discarded and, thus, one (i.e., D=1) slip bit is required in instance 111c.

Having discussed the identification of the candidate sets for instance 111c, reference is now made to operation of the look ahead sets, including both level 1 and level 2 of look ahead bits, in instance 111a. As mentioned above, some look ahead bits per comparison instance may be transferred between look ahead levels, or to the candidate level. Note that this functionality is similar, but not identical, to the single bit framer. In the single bit framer, each transfer is from one level to a lower level. In contrast, for the multiple bit framer, a transfer may be from one level to a lower level, or along the same level, but from one set of look ahead to a lower set of look ahead. These separate types of transfers are addressed below.

The number of sets of look ahead bits which are transferred to a lower level of look ahead (or to a candidate set level) also equals D and, again, the D indication represents the integer number of candidate sets which are discarded. For example, from instance 111a to instance 111c, one candidate set (i.e., Set I) is discarded. Thus, one set (i.e., D=1) of look ahead bits is transferred downward to the next lower level, namely, the first set of level 1 look ahead bits $b_5 c_5$ is transferred to a lower level which, in this instance, is the candidate level in instance 111c. Similarly, the first set of level 2 look ahead bits (i.e., $c_1$) is transferred to look ahead Set IV of the next lowest level which, in this instance, is the level 1 of look ahead bits in instance 111c. Note also that downward transferring in this fashion may cause bits in a given set on one level to be in a different set on a lower level. For example, the transfer of $b_5 c_5$ discussed above involves a transfer from Set I on level 1 of look ahead to Set IV on the candidate bit level. As another example, the transfer of $c_9$ discussed above causes a bit in Set I of level 2 of look ahead to transfer to Set IV of level 1 of look ahead. Note also that no shifting of bits occurs when sets are transferred from one level to a lower level.

The number of sets of look ahead bits which are both shifted and then transferred to a lower set on the same level of look ahead equals the number of candidate sets which are not discarded (i.e., the number of candidate sets transferred from one instance to the next successive instance). For example, from instance 111a to instance 111c, again, three candidate sets are not discarded but (after shifting) are transferred from instance 111a to instance 111c. Thus, three sets of look ahead bits are shifted and then transferred to a lower set within level 1 of look ahead. Thus, Set II of level 1 look ahead bits $b_6 c_6$ is first shifted to eliminate the oldest bit, $b_6$, and then $c_6$ is transferred to Set I of the same level 1. Similarly, Set III of level 1 look ahead bits, $b_7 c_7$, is shifted to eliminate $b_7$ and then $c_7$ is transferred to Set II of the same level 1. Lastly, Set IV of level 1 look ahead bits, $b_8 c_8$, is shifted to eliminate $b_8$ and then $c_8$ is transferred Set I of the same level 1.

The remaining bits to be discussed in connection with instance 111c are the newly identified look ahead bits, that is, those not transferred forward from earlier look ahead bits. Before proceeding, note from the above that, and similar to the single bit framer, in instances after the first instance, numerous look ahead bits per comparison instance are transferred forward from higher look ahead levels. In the multiple bit framer, however, the transfer may be within the same level of look ahead, but descending in sets within that level. Alternatively, the transfer may be from a higher look ahead level to a lower look ahead level. In any case, as a result of the transferred look ahead bit(s), only in the initial instance 111a are all look ahead bits obtained for each intermediary bit. Thereafter, only look ahead bits corresponding to the last intermediary bit are obtained, while the look ahead bits corresponding to the non-last intermediary bits are identified by transferring forward from previous look ahead levels.

Addressing specifically the look ahead bits newly obtained in instance 111c, note that such bits are identified according to the same method as instance 111a, but solely in connection with the last intermediary bit of each of the four candidate Sets, and not for the non-last intermediary bits (which have corresponding look ahead bits transferred forward from earlier-stored look ahead). Thus, in instance 111c, $d_3$, $d_4$, and $d_5$ are the respective last intermediary bits of each of the four candidate sets. Recall that the number of respective look ahead bits is the same as the relative position of the intermediary bit (e.g., second position in the example, meaning two look ahead bits). Recall further for a multiple bit framer that the look ahead bits do not immediately follow their respective intermediary bits but, instead, are a multiple of Z bits following the intermediary bit. Thus, the two look ahead bits corresponding to $d_2$ are $d_6$ and $d_{10}$, the two look ahead bits corresponding to $d_3$ are $d_7$ and $d_{11}$, the two look ahead bits corresponding to $d_4$ are $d_8$ and $d_{12}$, and the two look ahead bits corresponding to $d_5$ are $d_9$ and $d_{13}$.

Regarding the look ahead sets and the shifting and/or transferring of such sets, one skilled in the art will appreciate that such operations maintain a sufficient history of earlier bits so that comparisons may be made by combining those retained bits with future bits to quickly evaluate whether such combinations match the framing pattern at issue. Again, like the single bit framer, without having saved the look ahead bits, a great deal of time would be wasted having to, in effect, start over with each new candidate set by awaiting arrival of enough new bits to determine whether the new candidate set matches the framing pattern at issue.

Having an appreciation of the transfer of bits above, note further the transfer of the error register sets of bits. Particularly, note that the bit sets of the error register are transferred in the same manner as the candidate sets because the error register contents correspond to the candidate sets. Thus, the error register bits either remain the same or transfer one or more sets depending on whether one or more candidate sets mismatch. For example, after instance 111a, candidate Sets II, III, and IV becomes candidate Sets I, II, and III of instance 111c because Set I mismatches in instance 111b as described above. Consequently, and in a similar manner, the error register sets transfer such that the Set II bit in instance 111b becomes the Set I bit during comparison instance 111c, the Set III bit in instance 111b becomes the Set II bit during comparison instance 111c, and the Set IV bit in instance 111b becomes the Set III bit during comparison instance 111c. Note also that error register Set IV in instance 111c is cleared; this is to reflect that one new set of candidate bits (i.e., $b_5c_5d_5e_5$) has been created for consideration in view of the framing pattern.

Regarding the transferring and/or clearing of the error register bits, one skilled in the art will appreciate that after the transfer (and clearing, if applicable) of error register sets, in instance 111c the error register sets will reflect the current status of the corresponding candidate sets. For example, in instance 111c, candidate Sets I through III have thus far been compared to the framing pattern at issue and have matched; consequently, the corresponding error register Sets I through III indicate a logical 0. Moreover, in instance 111c, candidate Set IV has not yet yielded a mismatch (because it has not yet been compared to the framing pattern at issue) and, thus, the corresponding error register Set IV also indicates a logical 0. Thus, the error register provides a corresponding history of past comparisons so that such history is available for future comparisons rather than starting over with no considerations after a mismatch occurs.

Given the methodologies set forth above, reference is now to the remaining instances of FIG. 5e to further demonstrate the application of such methodologies.

In instance 111d, Sets I and II of candidate bits mismatch, while Sets III and IV of candidate bits match. Because of the two mismatches, the framer discards candidate Sets I and II, and shifts and transfers the first passing set, Set III of $a_4c_4d_4e_4$, to become part of Set I for the next comparison instance 111f, as well as the next set, Set IV of $b_5c_5d_5e_5$, to become part of Set II for the next comparison instance 111f. Note again that the "shift" drops the oldest bit of a set (e.g., $a_4$ of Set III of instance 111c, or $b_5$ of Set IV of instance 111c). After the shift and transfer, a new candidate bit is added to each of the two new shifted sets by obtaining a bit M bits after the last candidate bit of each of the partial sets. Thus, $f_4$ is added to Set I because it is M bits after $e_4$, and $f_5$ is added to Set II because it is M bits after $e_5$.

With respect to candidate Sets III and IV of instance 111e, recall that the number of sets of look ahead bits which are transferred to a lower level of look ahead (or to a set on the candidate level) also equals D, that is, the number of candidate sets which are discarded. In this example, therefore, two candidate sets are so discarded and, thus, two sets (i.e., D=2) of look ahead bits are transferred downward to the next successive level. Thus, Set I of look ahead level 1 from instance 111c is transferred to candidate Set III of instance 111e and Set II of look ahead level 1 from instance 111c is transferred to candidate Set IV of instance 111e. Moreover, respective slip bits, $e_6$ and $e_7$, are added to the transferred bits. Lastly, respective new candidate bits, $f_6$ and $f_7$, are included in the new candidate Sets III and IV, where the new candidate bits are M bits following the respective slip bits. Thus, in this example, two slip bits are required. In other words, two candidate sets (i.e., Set I and II) are discarded from instance 111c to instance 111e and, thus, two (i.e., D=2) slip bits are required in instance 111c.

Note also that the transfer down from levels applies between level 2 and level 1 of look ahead (as well as between level 1 and the candidate level, described above). Thus, level 2 Sets I and II in instance 111c (i.e., $d_{10}$ and $d_{11}$) are transferred to level 1 Sets III and IV in instance 111e.

With respect to the number of sets of look ahead bits which are both shifted and then transferred between like levels on instances 111c and 111e, again such a number equals the number of candidate sets which are not discarded and, thus, two such candidate sets are not discarded in this example. Therefore, two look ahead sets, namely, $c_8d_8$ and $c_9d_9$ are shifted to discard $c_8$ and $c_9$, while $d_8$ and $d_9$ are transferred from Sets III and IV in instance 111c to Sets I and II in instance 111e, respectively, all remaining in level 1 look ahead.

With respect to newly obtained look ahead bits in instance 111e, again such bits are obtained only for the last intermediary bits (i.e., $e_4$, $e_5$, $e_6$, and $e_7$ in the example). Moreover, for each such bit, two new look ahead bits are obtained because each bit is in the second relative numeric position. Lastly, the look ahead bits do not immediately follow their respective intermediary bits but, instead, are a multiple of Z bits following the last intermediary bit.

Lastly, reference is made to the transfer of the error register bits between instances 111c and 111e. In instance 111d, Set I and II of the error register are logical 1 because of the mismatch of candidate Set I and II, and Set III and IV of the error register are logical 0 because of the match of candidate Set III and IV. In instance 111e, however, because the sets (or bits) of the error register are transferred in the same manner as the candidate sets, Sets III and IV of instance 111d are transferred to Sets I and II of instance 111e. Note also that Sets III and IV of the error register in instance 111e are cleared; this is to reflect that two new sets of candidate bits (i.e., $c_6d_6e_6f_6$ and $c_7d_7e_7f_7$) have been created for consideration in view of the framing pattern.

In instance 111f, all candidate sets mismatch and, thus, the framer discards all candidate sets. Note, therefore, that no candidate sets are shifted and transferred from instance 111e to instance 111g. Moreover, to create candidate sets for instance 111g, four sets of look ahead bits are transferred from instance 111e level 1 look ahead to the candidate sets in instance 111g (i.e., because the number of discarded candidate sets is D=4). Additionally, four respective slip bits, $f_8$ through $f_{11}$, are added to the respective transferred bits. Lastly, respective new candidate bits, $g_8$ through $g_{11}$, are included in the new candidate Sets I through IV of instance 111g, where the new candidate bits are M bits following the respective slip bits.

Note also that the transfer down from levels applies between level 2 and level 1 of look ahead (as well as between level 1 and the candidate level, described above). Thus, level 2 Sets I through IV in instance 111e (i.e., $e_{12}$ through $e_{15}$) are transferred to level 1 Sets I through IV in instance 111g.

With respect to the number of sets of look ahead bits which are both shifted and then transferred between like levels on instances 111e and 111g, again such a number equals the number of candidate sets which are not discarded and, thus, no such sets are not discarded in this example.

With respect to newly obtained look ahead bits in instance 111g, again such bits are obtained only for the last intermediary bits and two new look ahead bits are obtained because each last intermediary bit is in the second relative numeric position. Further, the look ahead bits do not immediately follow their respective intermediary bits but, instead, are a multiple of Z bits following the intermediary bit.

Finally, reference is made to the transfer of the error register bits between instances 111e and 111g. In instance 111f, Sets I through IV of the error register are logical 1 because of all four mismatches of candidate Sets I through IV. In instance 111g, moreover, because the bits of the error register are transferred in the same manner as the candidate sets, no error register sets are transferred because no candidate sets were transferred. Moreover, in instance 111g, all sets of the error register are cleared because four new sets of candidate bits have been created in instance 111g for consideration in view of the framing pattern.

Referring now to instances 111g through 111i, only candidate Set I matches in instance 111h while the remaining three candidate sets mismatch. Because candidate Set I matches, the framer does not discard any candidate set. Thus, all four candidate sets in instance 111g are shifted and transferred to the candidate sets in instance 111i. Similarly, with respect to the number of sets of look ahead bits which are both shifted and then transferred between like levels on instances 111g and 111i, because such a number equals the number of candidate sets which are not discarded (i.e., four in the current example), four such look ahead sets are shifted and transferred in this example. Thus, all four look ahead Sets (both level 1 and level 2) are shifted and transferred between instances 111g and 111i. Again, two newly obtained look ahead bits in instance 111e are obtained only for the last intermediary bits (i.e., $g_8$, $g_9$, $g_{10}$, and $g_{11}$ in the example) and are a multiple of Z bits following the respective last intermediary bits.

Lastly, reference is made to the transfer of the error register bits between instances 111g and 111i. In instance 111h, Set I of the error register is a logical 0 because of the match of candidate Set I and error register Sets II, III, and IV are logical 1 because of the mismatch of the candidate Sets II, III, and IV. In instance 111i, because the bits of the error register are transferred in the same manner as the candidate sets, all instance 111h error register sets are transferred to like sets in instance 111i.

As a final example, reference is made to the method between instances 111i and 111k. In instance 111j, candidate Set I is a mismatch (as in instance 111f). Thus, the framer discards candidate Set I. However, note that the error register bits in instance 111j indicate that all candidate sets following candidate Set I also are a mismatch because those error bits were transferred forward from comparison instance 111h. In other words, candidate Sets II, III, and IV have previously been determined not to be potential matches and, thus, need not be reconsidered during instance 111j. Consequently, these comparisons are labeled as "don't cares" in instance 111j. Thus, the operation from instances 111i to 111k is treated like all four candidate Sets are mismatches and, thus, is similar to the description set forth above between instances 111e and 111g. As a result, in instance 111i, all error register sets are cleared as four new candidate sets are created for comparison according to the principles set forth above.

From the above, one skilled in the art will recognize the application of the present invention to a multiple bit framer given the commonality of method between a single bit and multiple bit framer, but with the additional methodologies and the implementation in the preferred embodiment for a multiple bit framer.

Figure 6:
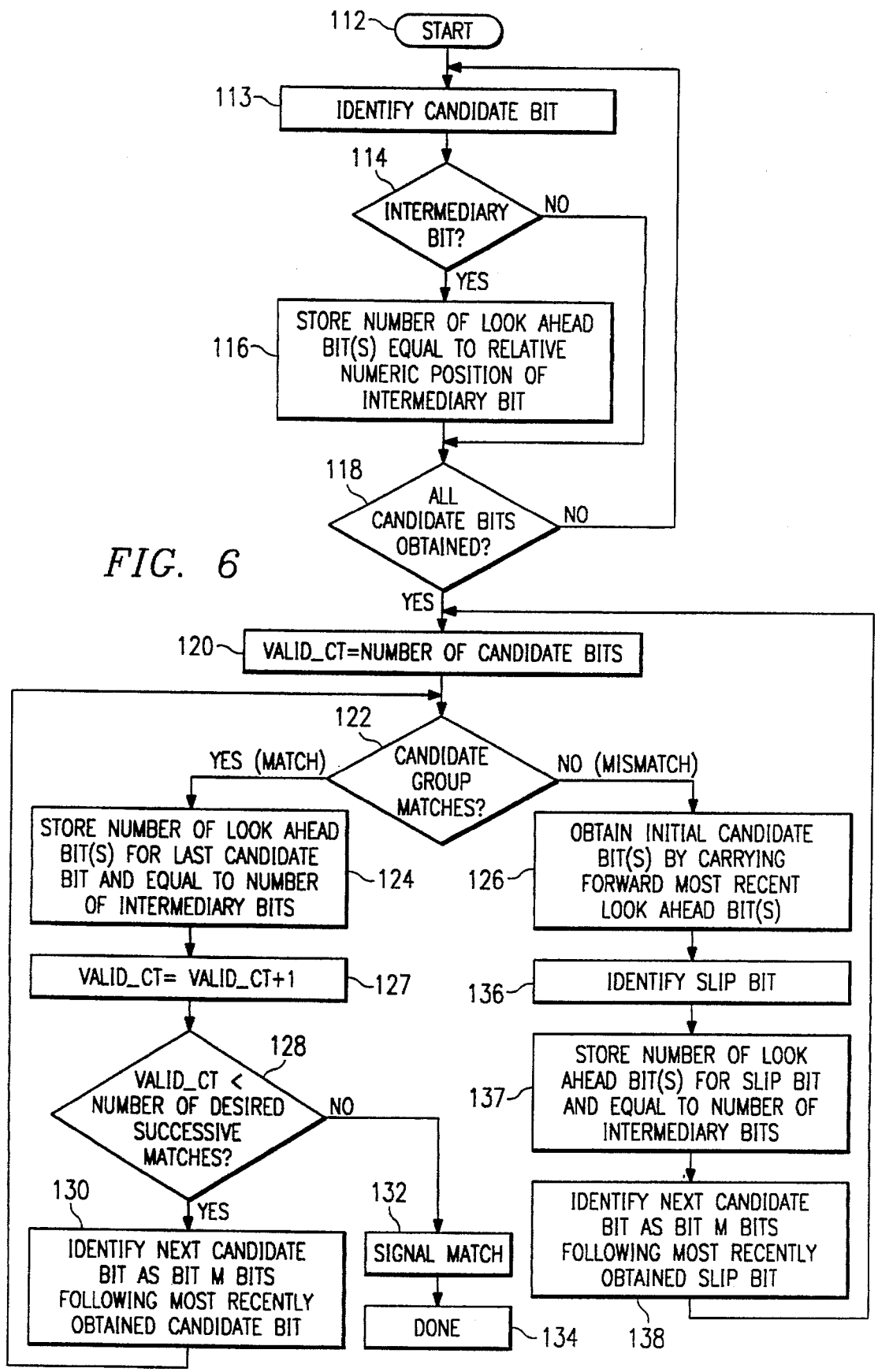
FIG. 6 illustrates a flow chart of the preferred method of searching a frame to locate the framing pattern in accordance with the present invention.

For purposes of illustration, FIG. 6 depicts a flow chart of the preferred method of searching a frame to locate the framing pattern in accordance with the description of FIGS. 5a–5e. The process commences in step 112 and continues to step 113 where a candidate bit is identified. Step 114 determines whether the identified candidate bit is an intermediary candidate bit; if so, the process continues to step 116 and if not, the process continues to step 118. Provided the candidate bit is an intermediary bit, step 116 stores a number of look ahead bits, where the number equals the relative numeric position of the intermediary bit. Thus, if the candidate bit from step 113 is the first intermediary bit, step 116 stores one look ahead bit. Similarly, if the candidate bit from step 113 is the second intermediary bit, step 116 stores two look ahead bits, and so forth for other relative numeric positions of other intermediary bits. The process then continues to step 118.

Step 118 determines whether all candidate bits for the initial comparison instance have been obtained. For example, if the method of FIG. 6 were applied to the sequence in FIG. 5c, step 118 determines whether a total of five candidate bits have been stored. If not, the process returns to step 113 and continues until the appropriate number of candidate bits for a comparison are acquired. Next, step 120 sets a counter to equal the number of appropriate candidate bits acquired thus far, and the process continues to step 122.

Step 122 determines whether the group of candidate bits match the pattern, or portion of the pattern, at issue. For example, in the DS3 example of FIG. 3, step 122 would compare three candidate bits to the possibilities set forth in Table 1. If the candidate bits match the pattern (or any one of several patterns) at issue, the process continues to step 124. If a mismatch occurs, the process continues to step 126.

Step 124 gathers one or more look ahead bits corresponding to the last obtained candidate. In particular, and in accordance with FIGS. 5a–5c, step 124 gathers a number of look ahead bits equal to the number of intermediary bits at issue. Thus, if FIG. 6 were applied to the sequence of FIG.

5c, step 124 would gather three look ahead bits. Moreover, note that the look ahead bits correspond to the most recently obtained candidate bit (from step 113), and that such a candidate bit will actually be the last intermediary bit during the next comparison step as described below. Steps 127 and 128 follow step 124, and perform the same purpose as steps 75a and 75b in FIG. 3. Thus, step 127 increments a count of valid and matched candidates, and step 128 determines whether a sufficient number of successive candidate bits have been identified. If step 128 determines that additional candidate bits should be checked, the process continues to step 130. Step 130 identifies the next candidate and is followed by a repetition of step 122 to perform the next comparison instance. Again, note that the candidate obtained in step 130 is the last candidate for the comparison made in the subsequent operation of step 122 and, as a result, the candidate referred to in the preceding step 124 is the last intermediary bit for the same comparison instance. As in steps 75a, 76, and 78 of FIG. 3, steps 128, 132, and 134 complete the sequence once an appropriate number of successive matching candidate bits are examined.

Returning to the comparison instance in step 122, recall that the method continues to step 126 if a mismatch occurs so that the set of candidate bits may be accumulated for a subsequent comparison instance. Particularly, step 126 obtains one or more candidate bits for the next comparison instance by carrying forward one or more look ahead bits from one or more previous look ahead levels. For example, if the method of FIG. 5 were applied to instance 108c of FIG. 5c, step 126 would carry forward $b_2$, $c_2$, and $d_2$ as the first three candidate bits for the next comparison instance. Next, step 136 obtains a slip bit, that is, the bit immediately following the last candidate bit used in a comparison instance. Again, continuing the example of instance 108c of FIG. 5c, the slip bit obtained by step 136 is $e_2$. Next, step 137 obtains one or more look ahead bits corresponding to the slip bit from step 136. Again, the number of look ahead bits obtained equals the number of intermediary bits at issue. Thus, in the example instance 108c of FIG. 5c, three look ahead bits are obtained because there are three intermediary bits. Last, step 138 identifies the last candidate bit for the set of candidate bits to be compared, and does so by identifying the bit which is M bits following the slip bit (e.g., bit $f_2$ in instance 108c of FIG. 5c). Finally, the process returns to step 120 so that another comparison instance occurs, thereby continuing the method until the proper pattern is recognized.

One skilled in the art will readily appreciate that the flow chart of FIG. 6 demonstrates steps common to both single and multiple bit framers. Given the above, therefore, FIG. 7 illustrates a flow chart which overviews the additional considerations for a multiple bit framer as demonstrated in the description of FIG. 5e, with it understood that the principles common to single and multiple bit framers are necessarily included as shown by FIG. 6.

With reference to FIG. 7, The process commences in step 140 and continues to step 142 where a first candidate set is identified. Next, in step 144, for a Z bit framer, an additional Z-1 ascending candidate sets are identified. For purposes of this document, the reference to "ascending" is an indication that the bits of one candidate follow the respective bits of a "descending" set. This relative positioning is best appreciated from the ascending (or descending) manner of the subscripts of the subject bits. For example, candidate Set II (e.g., $a_2b_2c_2d_2$) is ascending with respect to candidate Set I (e.g., $a_1b_1c_1d_1$) because each candidate bit of Set II sequentially follows the respective bit of candidate Set I (i.e., the first bit of Set II follows the first bit of Set I, the second bit of Set II follows the second bit of Set I, and so forth). Note also that a bit of a set ascending with respect to a descending set may immediately follow in sequence or may follow several bits thereafter. For example, candidate Set IV is also ascending with respect to candidate Set I because each candidate bit of Set IV sequentially follows the respective bit of candidate Set I, but instead of immediately following, each bit of candidate Set IV sequentially follows three bits after the respective bit in candidate Set I.

Note again that each candidate set has a first candidate, a last candidate bit, and one or more intermediary bits. Step 146 identifies groups of look ahead bits for each respective intermediary bit. As in the case of the single bit framer, the number of look ahead bits for a given intermediary bit group equals the relative numeric position of the intermediary bit. However, each look ahead bit follows the corresponding intermediary bit by a multiple of Z rather than immediately following the intermediary bit as in the case of a single bit framer. Note further that the groups of step 146 are preferably combined into the levels of look ahead and sets as illustrated in FIG. 5e. Thus, the groups of look ahead bits are combined to create a number of look ahead levels, where the number of levels equals the number of intermediary bits in each candidate set. Moreover, each level of look ahead includes Z number of sets, that is, the same number of sets as the number of candidate sets at issue. Lastly, note that each look ahead set in the first level of look ahead includes the same number of bits as the number of intermediary bits, while each ascending level of look ahead (i.e., level 2, level 3, and so forth, if applicable) has one less look ahead bit in comparison to the immediately preceding descending level. For example, referring back to FIG. 5e, each candidate set has two intermediary bits and, thus, each look ahead set in level 1 of look ahead includes two bits. Further, each look ahead set of the next ascending level of look ahead (i.e., level 2) has one lesser look ahead bit than the immediately preceding descending level 1 and, thus, has one bit (i.e., 2-1=1).

Step 148 determines whether each of the Z candidate sets match the pattern, or portion of the pattern, at issue. Further, the results of the comparisons are written to the error register (which is pre-loaded with logical zeroes) by writing a logical 1 to the error register set or sets corresponding to a mismatch, and by leaving the logical zeroes in the error register set or sets corresponding to a match.

Step 150 discards one or more candidate sets, starting with candidate Set I, until a matching candidate set is encountered. Again, for reference in this document, the integer D indicates the number of discarded candidate sets.

Step 152 identifies a first group of candidate sets for the next comparison instance, where the first group includes those candidate sets which include bits from those candidate sets which were not discarded in step 150. Thus, the first group will include Z-D candidate sets. Recall, each candidate set of the first group is created, in part, by shifting and transferring the non-discarded sets from step 150. Thus, each non-discarded candidate set is shifted to discard the oldest received bit of such a set, and the shifted bits are transferred to the next comparison instance. Moreover, an additional candidate bit is added to each of the non-discarded and shifted sets, where the additional candidate bit is M bits following the last bit in the respective shifted candidate set.

Step 154 identifies a second group of candidate sets for the next comparison instance, where the second group includes new candidate sets which include bits of previous look ahead sets. Further, the new candidate sets of the second group will include D candidate sets, that is, the number of candidate sets in the second group will equal the number of candidate sets which are discarded in step 150. Recall, each candidate set of the second group is created, in part, by transferring the level 1 look ahead bits from step 146. Further, a slip bit is added to each candidate set of the second group where the slip bit is M bits after the last transferred look ahead bit for a given new set. Note further that the slip bit (or bits if multiple new candidate sets are created) immediately follow the last intermediary bit of the first group of new candidate sets. Finally, an additional new candidate bit is added to each of the second group of candidate sets, where the additional new candidate bit is M bits following the respective slip bit.

Step 156, in a manner similar to step 146, identifies groups of look ahead bits for each respective intermediary bit of the new candidate sets created in step 154. Again, the number of look ahead bits for a given intermediary bit group equals the relative numeric position of the intermediary bit and each look ahead bit follows the corresponding intermediary bit by a multiple of Z. However, and like the single bit framer, only look ahead bits corresponding to the last intermediary bit of each new candidate set are newly identified, while the look ahead bits corresponding to the non-last intermediary bits are identified by carrying forward earlier look ahead bits. Recall that the manner of carrying forward look ahead bits depends on whether the bits change level. Particularly, the number of sets of look ahead bits which are transferred to a lower level of look ahead equals the number of candidate sets which are discarded (i.e., D), while the number of sets of look ahead bits which are both shifted and then transferred to a lower set on the same level of look ahead equals the number of candidate sets which are not discarded. Lastly, note again that the groups of look ahead bits are also combined to form the same number of sets as the number of candidate sets, and across a number of levels of look ahead where the number equals the number of intermediary bits in each candidate set.

Once step 156 is complete, the flow returns to step 148. Thereafter, the process continues until a match is repeated a sufficient number of times as detailed in the above examples and more fully explained in connection with FIG. 6.

From the above, it may be appreciated that the embodiments of the present invention provide an improved method and apparatus for identifying the framing pattern in a serial data stream. Note that while the present invention has been described in detail, various substitutions, modifications or alterations could be made to the descriptions set forth above by a person skilled in the art. For example, while the embodiments of FIGS. 3 through 5e illustrate certain size of candidate sets, the inventive aspects apply equally to other size candidate sets as well. As another example, while the DS3 serial data frame is described, the present invention is also applicable to any other serial data format wherein certain bits within the data stream define its boundaries. As another example, while each bit of the framing pattern described herein is periodically spaced (i.e., a constant number from other like bits), the number of bits between such bits could vary, so that, for example, a second framing bit is five bits after a first, while the third is ten bits after the second, and so forth. As yet another example, any number of bits may exist within the framing pattern. As still another example, while the look ahead bit(s) is preferably the bit immediately following a candidate bit, it need only follow the candidate bit by a known predetermined number of bits, such as two or more, while still serving the function of advancing the collection of candidate bits for a subsequent test to determine if the framing pattern is valid. As yet another example, while the slipping function is described as slipping only one bit after the last candidate bit, this function, like the look ahead bit, also may be increased so that slipping allows one or more bits to be skipped before the next bit is obtained as a candidate for subsequent analyses. As still another example, while the embodiment of FIG. 4 illustrates a hardware approach, a combined software and hardware approach could be created to perform the steps of FIG. 3. As still a final example, numerous approaches using hardware and/or software could implement the method of FIGS. 5a, 5b, 5c, and 6 as well. Thus, each of these examples, as well as the embodiments described herein, demonstrate that the present invention is subject to change by a person skilled in the art without departing from the invention which is defined by the following claims.

What is claimed is:

1. A method of identifying at least a portion of a framing pattern in a data stream comprising a plurality of sequential bits, the method comprising the steps of:

identifying a set of successive candidate bits, wherein the identified candidate bits are spaced apart from one another and comprise:
   a first candidate bit;
   a last candidate bit; and
   an integer I of intermediary bits between said first candidate bit and said last candidate bit, wherein each of said intermediary bits has a numeric relative bit position between said first candidate bit and said last candidate bit;

identifying a group of look ahead bits corresponding to each of said intermediary bits, wherein each of said groups comprises a number of look ahead bits, wherein for each of said groups corresponding to an intermediary bit, said number of look ahead bits equals in magnitude said numeric relative bit position for the intermediary bit corresponding to said group;

determining whether said first candidate bit, said last candidate bit, and said intermediary bits match at least said portion of the framing pattern; and wherein said set comprises a first candidate set in an integer Z multiple bit framer, and further comprising the step of identifying an integer Z-1 ascending candidate sets, wherein each said ascending candidate set comprises successive candidate bits and has a numeric relative set position, and wherein the identified candidate bits of each of said integer Z-1 ascending candidate sets are spaced apart from one another and comprise:
   a first candidate bit an ascending number of bits following said first candidate bit of said first set;
   a last candidate bit said ascending number of bits following said last candidate bit of said first set; and
   said integer I of intermediary bits between said first candidate bit and said last candidate bit, wherein each of said intermediary bits has a numeric relative bit position between said first candidate bit and said last candidate bit, and wherein each intermediary bit is said ascending number of bits following the bit in said first set having the same numeric relative bit position.

2. The method of claim 1 and further comprising the step of, for each of said integer Z-1 ascending candidate sets, determining whether said first candidate bit, said last candidate bit, and said intermediary bits of a respective one of said integer Z-1 ascending candidate sets match at least said portion of the framing pattern.

3. The method of claim 2 and further comprising the steps of:

storing a first binary value in an error register having said integer Z number of locations, each of said locations corresponding to a respective one of said first and said ascending candidate sets; and storing a second binary value in each said register location corresponding to a candidate set determined to be a mismatch in said determining steps.

4. The method of claim 1 and further comprising the steps of:

discarding said first candidate set of candidate bits in response to said determining step if said first candidate set of candidate bits does not match said portion of the framing pattern; and discarding each successive one of said integer Z-1 candidate sets until identifying a first of said integer Z-1 candidate sets which comprises a matching candidate set matching said portion of the framing pattern, such that a total of an integer D candidate sets are discarded.

5. The method of claim 1 and further comprising the steps of:

for each intermediary bit of each of said first candidate set and each of said Z-1 ascending candidate sets, identifying a respective group of look ahead bits corresponding to said intermediary bits, wherein each said respective group comprises a number of look ahead bits, wherein said number of look ahead bits in each said respective group equals in magnitude said numeric relative bit position for the intermediary bit corresponding to said respective group, wherein for each said respective group each of said look ahead bits is an integer multiple of said integer Z bits apart from said corresponding intermediary bit;

wherein each of said look ahead bits in said group corresponding to said first candidate set is an integer multiple of said integer Z bits apart from said corresponding intermediary bit of said first candidate set; and combining each said group of look ahead bits corresponding to said first candidate set and said Z-1 ascending candidate sets to form a number, equal to said integer number I, of levels of look ahead bits, wherein each said level of look ahead bits comprises said integer Z of look ahead sets, wherein each look ahead set of a first level of look ahead bits comprises said integer number I of bits, and wherein each look ahead set ascending from said first level of look ahead bits comprises one less bit than the immediately preceding ascending look ahead set.

6. The method of claim 5 and further comprising the steps of:

discarding said first candidate set of candidate bits in response to said determining step if said first candidate set of candidate bits does not match said portion of the framing pattern; and discarding each successive one of said integer Z-1 candidate sets until identifying a first of said integer Z-1 candidate sets which comprises a matching candidate set matching said portion of the framing pattern, such that a total of an integer D candidate sets are discarded.

7. The method of claim 6 wherein each of the candidate bits of the first candidate set and of said Z-1 ascending candidate sets are spaced apart from one another by an integer M and, after said discarding steps, further comprising the step of identifying a first group of an integer Z-D new ascending candidate sets, wherein each of said new ascending candidate sets has a numeric relative set position relative to other new ascending candidate sets, and wherein each of said first group of new ascending candidate sets comprise:

one of said integer Z-1 ascending candidate sets after discarding an oldest received bit of the respective one of said integer Z-1 ascending candidate sets; and an additional candidate bit following, by said integer M, said last candidate bit of said one of said Z-1 ascending candidate sets.

8. The method of claim 7 and further comprising the step of identifying a second group of said integer D new ascending candidate sets, wherein each of said second group of new ascending candidate sets comprise:

at least one look ahead set of said first level of look ahead bits;

a slip bit following said at least one look ahead bit by said integer M; and an additional candidate bit following said slip bit by said integer M.

9. The method of claim 8 and further comprising the step of, for each of said first and second groups of new ascending candidate sets, determining whether said bits of said respective candidate sets match at least said portion of the framing pattern.

10. The method of claim 8 and further comprising the steps of:

for each intermediary bit of said first and second groups of new ascending candidate sets, identifying a respective new look ahead group of look ahead bits corresponding to intermediary bits of each said new ascending candidate set, wherein each said respective new look ahead group comprises a number of look ahead bits, wherein said number of look ahead bits in each said respective new look ahead group equals in magnitude said numeric relative bit position for the intermediary bit corresponding to said respective new group, wherein for each said respective new group each of said look ahead bits is an integer multiple of said integer Z bits apart from said corresponding intermediary bit; and combining each said respective new group of look ahead bits to form a number, equal to said integer number I, of new levels of look ahead bits, wherein each said new level of look ahead bits comprises said integer Z of new look ahead sets, wherein each said new look ahead set of a first level of new look ahead bits comprises said integer number I of bits, and wherein each said new look ahead set ascending from said first level of new look ahead bits comprises one less bit than the immediately preceding ascending look ahead set.

11. A method of identifying at least a portion of a framing pattern in a data stream comprising a plurality of sequential bits, the method comprising the steps of:

identifying a set of successive candidate bits, wherein the identified candidate bits are spaced apart from one another and comprise:

a first candidate bit;

a last candidate bit; and an integer I of intermediary bits between said first candidate bit and said last candidate bit, wherein each of said intermediary bits has a numeric relative bit position between said first candidate bit and said last candidate bit;

identifying a group of look ahead bits corresponding to each of said intermediary bits, wherein each of said groups comprises a number of look ahead bits, wherein for each of said groups corresponding to an intermediary bit, said number of look ahead bits equals in magnitude said numeric relative bit position for the intermediary bit corresponding to said group;

determining whether said first candidate bit, said last candidate bit, and said intermediary bits match at least said portion of the framing pattern; and wherein said set comprises a first set and, further comprising the steps of:

in response to determining a mismatch in said determining step, further comprising the steps of:

identifying a second set of candidate bits, wherein each of the candidate bits of the second set are spaced apart from one another by a fixed number and comprise:

at least one of said look ahead bits;

a slip bit immediately following said last candidate bit; and an additional candidate bit following said slip bit by said fixed number; and determining whether said second set of candidate bits match at least said portion of the framing pattern; and in response to determining a match in said determining step, further comprising the steps of:

identifying a number of additional look ahead bits corresponding to said last candidate bit, wherein said number of additional look ahead bits equals the predetermined number of intermediary bits;

identifying an additional candidate bit spaced apart from said last candidate bit; and determining whether said intermediary bits, said last candidate bit, and said additional candidate bit match at least said portion of the framing pattern.

12. The method of claim 11 wherein said integer I of intermediary bits comprises at least two intermediary bits.

13. The method of claim 11 wherein said data stream comprises a DS3 data stream and said integer I of intermediary bits comprises at least two intermediary bits.

14. The method of claim 11 wherein said first and second candidate bits correspond to a first group of candidate bit sets in a Z multiple bit framer.

* * * * *

UNITED STATES PATENT AND TRADEMARK OFFICE
CERTIFICATE OF CORRECTION

PATENT NO. : 5,666,547
DATED : September 9, 1997
INVENTOR(S) : Gary Lloyd James, et. al.

It is certified that error appears in the above-identified patent and that said Letters Patent is hereby corrected as shown below:

Col. 3, ln. 21, delete "as the N1 bits", insert -- as the N-1 bits --.

Col. 3, ln. 55, delete "VALIDCNT", insert -- VALID_CNT --.

Col. 4, ln. 2, delete "VALIDCNT", insert -- VALID_CNT --.

Col. 7, ln. 48, delete "VALIDCNT", insert -- VALID_CNT --.

Col. 8, ln. 2, delete "VALIDCNT", insert -- VALID_CNT --.

Col. 13, ln. 53, delete "$d_3$, Accordingly,", insert -- $d_3$. Accordingly, --.

Col. 19, ln. 17-18, delete "oldest bit, thereby", insert -- oldest bit, $a_2$, thereby --.

Col. 20, ln. 19, delete "(i.e., $c_1$)", insert -- (i.e., $c_9$) --.

Col. 21, ln. 5-6, delete "instance 111c, $d_3$, $d_4$, and $d_5$ are", insert -- instance 111c, $d_2$, $d_3$, $d_4$, and $d_5$ are --.

Col. 22, ln. 5, delete "$a_4c_4d_4e_4$,", insert -- $b_4c_4d_4e_4$ --.

UNITED STATES PATENT AND TRADEMARK OFFICE
CERTIFICATE OF CORRECTION

PATENT NO. : 5,666,547
DATED : September 9, 1997
INVENTOR(S) : Gary Lloyd James, et. al.

It is certified that error appears in the above-identified patent and that said Letters Patent is hereby corrected as shown below:

Col. 22, ln. 9, delete "$a_4$ of Set", insert -- $b_4$ of Set --.

Col. 22, ln. 45, delete "$c_9 d_9$ are shifted", insert -- $c_9 d_9$, are shifted --.

Signed and Sealed this

Twenty-third Day of December, 1997

Attest:

BRUCE LEHMAN

Attesting Officer

Commissioner of Patents and Trademarks